United States Patent
Cobb et al.

(10) Patent No.: US 6,839,181 B1
(45) Date of Patent: Jan. 4, 2005

(54) DISPLAY APPARATUS

(75) Inventors: Joshua M. Cobb, Victor, NY (US); Andrew F. Kurtz, Rochester, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/603,286

(22) Filed: Jun. 25, 2003

(51) Int. Cl.[7] .................. G02B 27/10; G02B 27/14; G03B 21/00
(52) U.S. Cl. .................. 359/634; 359/618; 353/31
(58) Field of Search .................. 359/618, 629, 359/634, 636, 637, 298, 318, 242, 246; 353/31, 33, 34, 81, 82; 349/25, 96, 113, 114, 8

(56) References Cited

U.S. PATENT DOCUMENTS

| | | |
|---|---|---|
| 2,403,731 A | 7/1946 | MacNeille |
| 3,202,039 A | 8/1965 | DeLang et al. |
| 3,681,521 A | 8/1972 | Doi et al. |
| 4,185,297 A | 1/1980 | Yamauchi et al. |
| 4,441,791 A | 4/1984 | Hornbeck |
| 4,836,649 A | 6/1989 | Ledebuhr et al. |
| 5,098,183 A | 3/1992 | Sonehara |
| 5,345,262 A | 9/1994 | Yee et al. |
| 5,357,289 A | 10/1994 | Konno et al. |
| 5,535,047 A | 7/1996 | Hornbeck |
| 5,555,186 A | 9/1996 | Shioya |
| 5,597,222 A | 1/1997 | Doany et al. |
| 5,600,383 A | 2/1997 | Hornbeck |
| 5,619,352 A | 4/1997 | Koch et al. |
| 5,621,486 A | 4/1997 | Doany et al. |
| 5,719,695 A | 2/1998 | Heimbuch |
| 5,798,819 A | 8/1998 | Hattori et al. |
| 5,808,795 A | 9/1998 | Shimomura et al. |
| 5,898,521 A | 4/1999 | Okada |
| 5,907,437 A | 5/1999 | Sprotbery et al. |
| 5,914,818 A | 6/1999 | Tejada et al. |
| 5,918,961 A | 7/1999 | Ueda |
| 5,930,050 A | 7/1999 | Dewald |
| 5,944,401 A | 8/1999 | Murakami et al. |
| 5,962,114 A | 10/1999 | Jonza et al. |
| 6,008,951 A | 12/1999 | Anderson |
| 6,010,221 A | 1/2000 | Maki et al. |
| 6,019,474 A | 2/2000 | Doany et al. |
| 6,062,694 A | 5/2000 | Oikawa et al. |
| 6,089,717 A | 7/2000 | Iwai |
| 6,172,813 B1 | 1/2001 | Tadic-Galeb et al. |
| 6,243,199 B1 | 6/2001 | Hansen et al. |
| 6,247,816 B1 | 6/2001 | Cipolla et al. |
| 6,262,851 B1 | 7/2001 | Marshall |
| 6,280,035 B1 | 8/2001 | Tadic-Galeb et al. |
| 6,288,840 B1 | 9/2001 | Perkins et al. |
| 6,439,725 B1 | 8/2002 | Na |
| 6,447,120 B1 | 9/2002 | Hansen et al. |
| 6,511,183 B2 | 1/2003 | Shimizu et al. |
| 6,536,903 B2 * | 3/2003 | Bone .................. 353/31 |

* cited by examiner

*Primary Examiner*—Georgia Epps
*Assistant Examiner*—Alicia M. Harrington
(74) *Attorney, Agent, or Firm*—Nelson Adrian Blish

(57) ABSTRACT

A display apparatus (10) comprises a light source (20) for forming a beam of light. Illumination optics shapes and directs the beam of light. A splitter for splits the beam of light into at least three color beams of light. A modulation optical system (120) for each of the three color beams of light comprises a pre-polarizer (160), a wire grid beamsplitter (170), a reflective spatial light modulator (30), and a polarization analyzer (165). An imaging relay lens (130) in each color provides an intermediate image of the reflective spatial light modulator from the modulated light for that color. A dichroic combiner (26) recombines the modulated light for each given color, such that the multiple color beams form the respective intermediate images along a common optical axis to form a combined intermediate image. A projection lens (32) images the combined intermediate image to a display screen. An imager field lens (140) provides nominally telecentric light to the spatial light modulators.

86 Claims, 9 Drawing Sheets

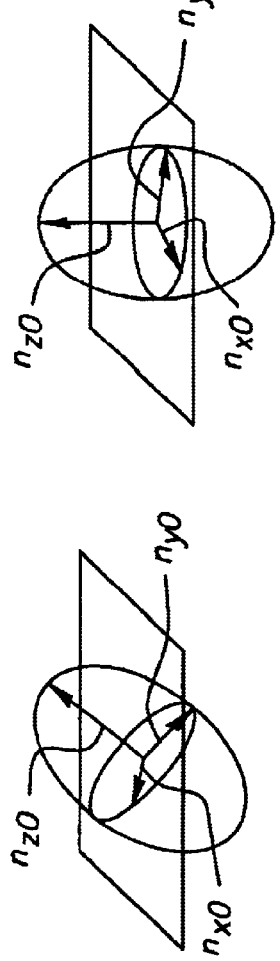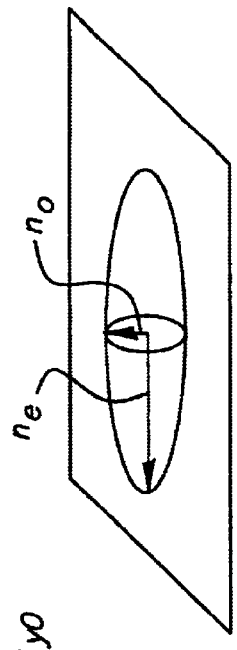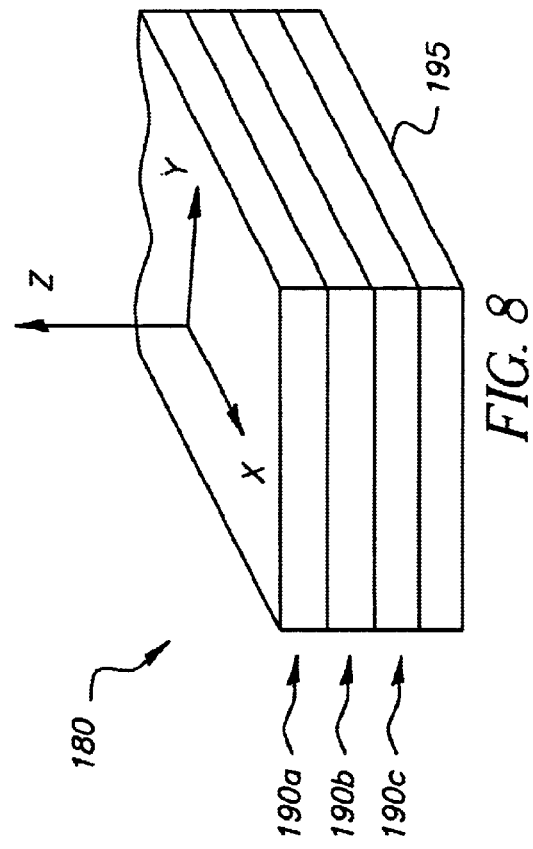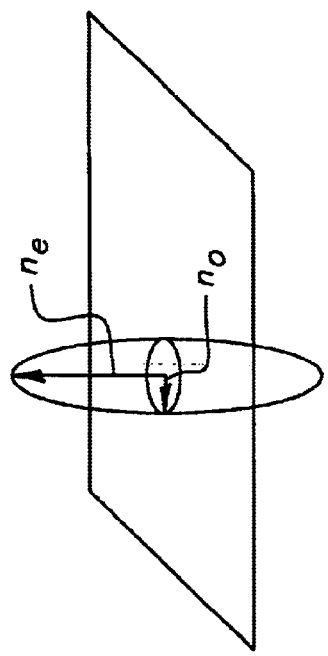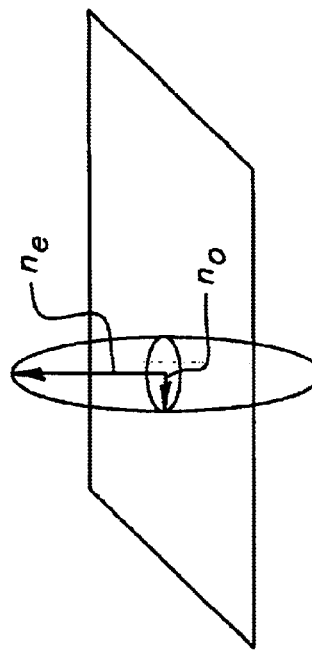

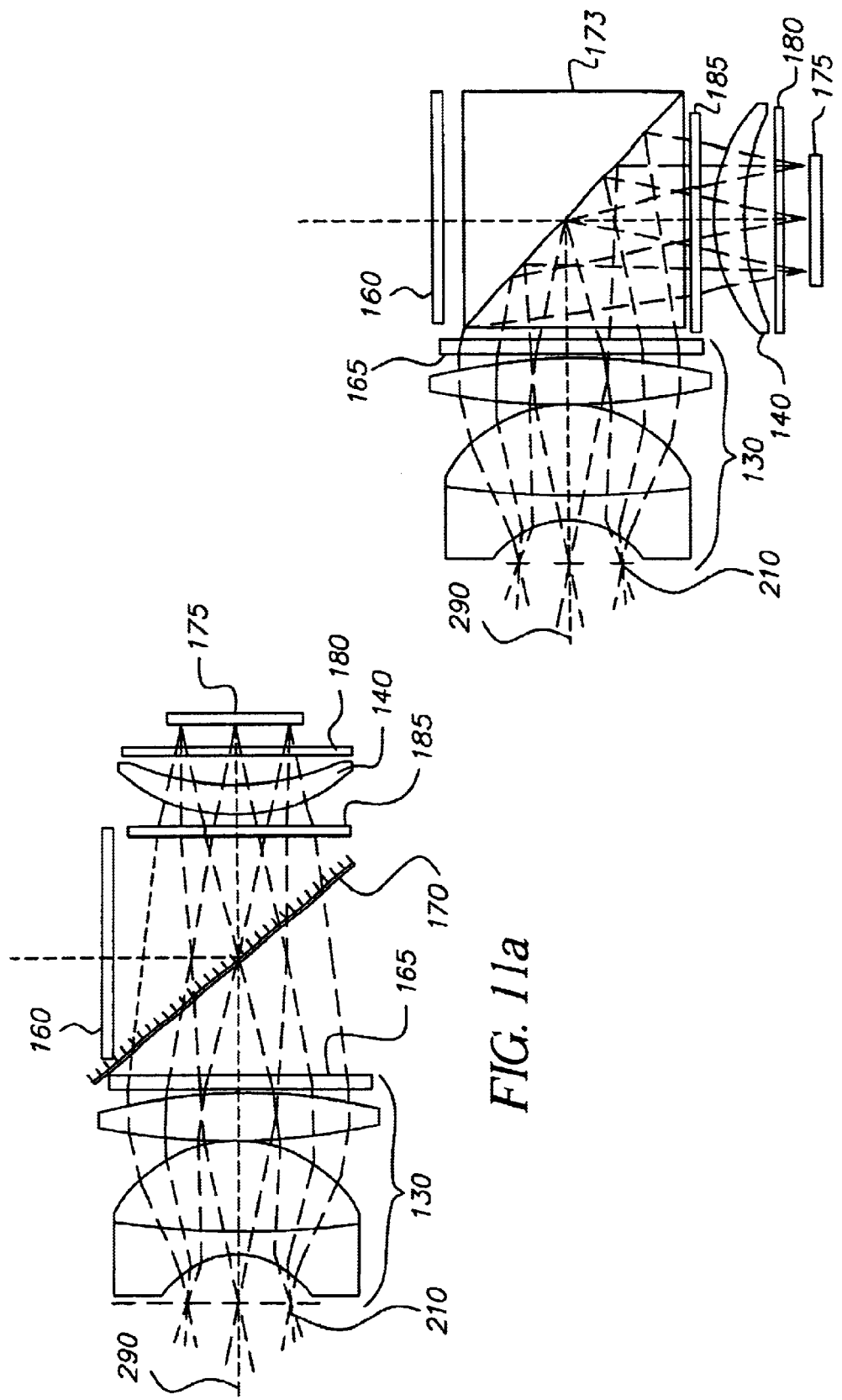

DISPLAY APPARATUS

CROSS REFERENCE TO RELATED APPLICATIONS

Reference is made to commonly-assigned U.S. patent application Ser. No. 09/813,207, fled Mar. 20, 2001, entitled A DIGITAL CINEMA PROJECTOR, by Kurtz et al., now U.S. Pat. No. 6,585,378; U.S. patent application Ser. No. 10/040,663, filed Jan. 7, 2002, entitled DISPLAY APPARATUS USING A WIRE GRID POLARIZING BEAMSPLIUER WITH COMPENSATOR, by Mi et al.; U.S. patent application Ser. No. 10/050,309, filed Jan. 16, 2002, entitled PROJECTION APPARATUS USWG SPATIAL LIGHT MODULATOR, by Joshua M. Cobb; U.S. patent application Ser. No. 10/131,871, filed Apr. 25, 2002, entitled PROJECTION APPARATUS USING SPATIAL LIGHT MODULATOR WITH RELAY LENS AND DICHROIC COMBINER, by Cobb et al, now U.S. Pat. No. 6,676,260; U.S. patent application Ser. No. 10/237,516, filed Sept. 9, 2002, entitled COLOR ILLUMINATION SYSTEM FOR SPATIAL LIGHT MODULATORS USING MULTIPLE DOUBLE TELECENTRIC RELAYS, by Joshua M. Cobb; and U.S. patent application Ser. No. 10/392,685, filed Mar. 20, 2003, entitled PROJECTION APPARATUS USING TELECENTRIC OPTICS, by Cobb et al., now U.S. Pat. No. 6,758,565, the disclosures of which are incorporated herein.

FIELD OF THE INVENTION

This invention generally relates to a projection apparatus that forms a color image from digital data using a spatial light modulator. More particularly, this invention relates to a projection apparatus that provides intermediate imaging optics that relay an image of a spatial light modulator to a projection lens, wherein the intermediate imaging relay optics include one or more field lenses located in proximity to the spatial light modulator.

BACKGROUND OF THE INVENTION

In order to be considered as suitable replacements for conventional film projectors, digital projection systems must meet demanding requirements for image quality. In particular, to provide a competitive alternative to conventional cinematic-quality projectors, an electronic or digital projection apparatus must meet high standards of performance, providing high resolution, wide color gamut, high brightness, and frame-sequential contrast ratios exceeding 1,000:1.

The most promising solutions for multicolor digital cinema projection employ, as image forming devices, one of two basic types of spatial light modulators. The first type of spatial light modulator is a digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951 (Anderson); and U.S. Pat. No. 6,089,717 (Iwai). DMDs have been employed in digital projection systems. However, although DMD-based projectors demonstrate some capability to provide the necessary light throughput, contrast ratio, and color gamut, inherent resolution limitations (with current devices providing only 1024×768 pixels) and high component and system costs have restricted DMD acceptability for high-quality digital cinema projection.

The second type of spatial light modulator used for digital projection is a liquid crystal device (LCD). The LCD forms an image as an array of pixels by selectively modulating the polarization state of incident light for each corresponding pixel. LCDs appear to have advantages as spatial light modulators for high-quality digital cinema projection systems. These advantages include relatively large device size and favorable device yields. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,221 (Maki et al.); and U.S. Pat. No. 6,062,694 (Oikawa et al.).

In an electronic projection apparatus using spatial light modulators, individual colors, conventionally red, green, and blue (RGB), are separately modulated in a corresponding red, green, or blue portion of the optical path. The modulated light of each color is then combined in order to form a composite, multicolor RGB image. There are two basic approaches for projection optics that combine the modulated color light. The first approach, which can be characterized as a convergent approach, is adapted from earlier, conventional projection systems. Using the convergent approach, the component red, green, and blue light have separate axes which are converged by separate projection optics that effectively direct and focus each light path as necessary in order to form a composite, multicolor color image at some focal plane. As an illustrative example, U.S. Pat. No. 5,345,262 (Yee et al.) discloses a convergent video projection system. Significantly, the disclosure of U.S. Pat. No. 5,345,262 illustrates one of the major problems with the convergent projection approach: namely, that the separate color images must be properly registered on the projection surface. Misregistration or poor focus along any one of the color light projection paths can easily result in an unsatisfactory image. It is instructive to observe that, using this approach, the image paths are converged only at the focus plane (screen).

U.S. Pat. No. 5,907,437 (Sprotbery et al.) discloses an attempt to simplify design complexity and alleviate some of the light path alignment and registration problems inherent to multicolor projection systems using the convergent approach described above. In the U.S. Pat. No. 5,907,437 disclosure, a light valve projection system is described in which a converging optical system converges the red, green, and blue modulated light paths in order to form an internal converged image, which is then re-imaged to the screen by the projection lens. The design strategy outlined in U.S. Pat. No. 5,907,437 thus simplifies the projection lens design task for a system using the convergent approach. However, other problems inherent to a convergent approach remain.

One notable problem with approaches similar to that disclosed in U.S. Pat. No. 5,907,437 is a relatively high etendue. As is well known in the optical arts, etendue relates to the amount of light that can be handled by an optical system. Potentially, the larger the etendue, the brighter the image. Numerically, etendue is proportional to the product of two factors, namely the image area and the square of the numerical aperture. Increasing the numerical aperture, for example, increases etendue so that the optical system captures more light. Similarly, increasing the source image size, so that light originates over a larger area, increases etendue and, therefore, brightness. As a general rule, increased etendue results in a more complex and costly optical design. Using an approach such as that outlined in U.S. Pat. No. 5,907,437, for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in U.S. Pat. No. 5,907,437, optical components handle a sizable image area, therefore a high etendue, since red, green, and blue color paths are separate and must be optically converged. Moreover, although the configuration disclosed in U.S. Pat. No. 5,907,437 handles light from three times the area of the final multicolor image formed, this configuration does not afford any benefit of increased brightness, since each color path contains only one-third of the total light level. In particular, the second relay lens and the projection lens of a convergent optics system such as that disclosed in U.S. Pat. No. 5,907,437 are inherently constrained by a large etendue, which adds cost and complexity to such a solution. Moreover, the second relay lens must be color corrected over the full visible spectrum. At the same time, different segments of the relay lens and of the projection lens handle different wavelengths, so that localized lens imperfections, dust, or dirt not only affect the projected image, but can impact the color quality. In light of etendue constraints, of color correction requirements, of dust and dirt sensitivity, and of the need for maximizing brightness levels for digital projection, there appear to be significant inherent limitations that hamper the convergent approach exemplified in U.S. Pat. No. 5,907,437.

An alternative approach to projection optics can be characterized as a coaxial approach. In contrast to the convergent approach in which component red, green and blue light beams are bent to converge at a focal plane, the coaxial approach combines the component red, green, and blue modulated light beams along a common axis. In order to do this, the coaxial approach employs a dichroic combining element, such as an X-cube or Philips prism. X-cubes or X-prisms and related dichroic optical elements, such as those disclosed in U.S. Pat. No. 5,098,183 (Sonehara) and U.S. Pat. No. 6,019,474 (Doany et al.) are well known in the optical imaging arts. The dichroic combining element combines modulated light from each color path and folds the color paths together along a common axis in order to provide the combined color image to a projection lens. Referring to FIG. 1, there is shown a simplified block diagram of a conventional digital projection apparatus 10 using the coaxial approach. Each color path (r=Red, g=Green, b=Blue) uses similar components for forming a modulated light beam. Individual components within each path are labeled with an appended r, g, or b, appropriately. For the description that follows, however, distinctions between color paths are specified only when necessary. Following any of the three color paths, a light source 20 provides unmodulated light, which is conditioned by uniformizing optics 22 to provide a uniform illumination. A polarizing beamsplitter 24 directs light having the appropriate polarization state to a spatial light modulator 30 which selectively modulates the polarization state of the incident light over an array of pixel sites. The action of spatial light modulator 30 forms an image. The modulated light from this image, transmitted along an optical axis $O_r$, $O_g$, $O_b$ through polarizing beamsplitter 24, is directed to a dichroic combiner 26, typically an X-cube, Philips prism, or combination of dichroic surfaces in conventional systems. Dichroic combiner 26 combines the red, green, and blue modulated images from separate optical axes $O_r$, $O_g$, $O_b$ to form a combined, multicolor image for a projection lens 32 along a common optical axis O for projection onto a display surface 40, such as a projection screen.

In contrast to the convergent approach outlined above with reference to U.S. Pat. No. 5,907,437, the coaxial approach, as shown in the block diagram of FIG. 1 and as exemplified in U.S. Pat. No. 5,808,795 has a number of advantages. With respect to light throughput, the coaxial approach, because it combines light paths along a common axis, does not increase the etendue of the optical system. Instead, with respect to projection lens 32, dichroic combiner 26, by folding the appropriate optical axes $O_r$ and $O_b$ to join with optical axis $O_g$ and form a common optical axis O, optically overlaps the areas of spatial light modulators 30r, 30g, 30b. Thus, the etendue has no increase whether one, two, three, or more spatial light modulators are combined in this way. Since each light color is separately modulated, then combined and provided to projection lens 32 along a common optical axis O, no optical system is required between dichroic combiner 26 and projection lens 32.

A Philips prism, such as that disclosed in U.S. Pat. No. 3,202,039 (DeLang et al.) could alternately be employed as dichroic combiner 26. Familiar to those skilled in the digital image projection arts, Philips prisms have been employed as chromatic separator or combiner components in projector designs such as those disclosed in U.S. Pat. Nos. 6,280,035 and 6,172,813 (both to Tadic-Galeb et al.); U.S. Pat. No. 6,262,851 (Marshall); and U.S. Pat. No. 5,621,486 (Doany et al.), for example.

While digital projection apparatus 10 designed using the basic model of FIG. 1 are able to provide good levels of image quality, there is room for improvement. Constraints imposed by dichroic coatings are a key consideration. Dichroic coatings used within dichroic combiner 26 can be expensive and difficult to design and fabricate for suitable performance with incident light over a wide range of angles, particularly in projection applications where high brightness levels and a broad color gamut are needed. Dichroic coatings reflect and transmit light as a function of incident angle and wavelength. As the incident angle varies, the wavelength of light that is transmitted or reflected also changes. Where a dichroic coating is used with an optical system having a low F# and a broad spectrum, the typical result is a variable efficiency versus both angle and wavelength for both transmitted and reflected light. Misalignment or wedge of the interior surfaces of an X-prism type dichroic combiner can also cause image separation, image blur, and color shading. The "seam" at which dichroic surfaces are combined tends to appear as one or more linear shadow artifacts in the displayed image. Fabrication of a high-quality X-cube is further complicated by the requirement that individual component prisms have identical refractive indices; in practice, this is best accomplished when the same glass melt is used for all prism components Generally these and other various problems that effect X-prisms can be overcome, and X-prisms are widely used in projection systems. However, obtaining high quality custom designed X-prisms can be a problem for prototype or low manufacturing volume applications. Moreover, high brightness applications such as occur in digital cinema systems, can impose high heat levels, which can damage adhesives and coating surfaces of the X-prism. Admittedly, the problems experienced with the dichroic separator (which sees intense light loads) and the dichroic combiner (which sees lower light loads, but through which the final image is formed) do not have the same sensitivities, but similar solutions may be needed by both. The design and fabrication of both the dichroic separator and combiner can be helped if the F# can be increased. In particular, if a larger F# light cone can be used, surface tolerance requirements in a dichroic combiner can be relaxed, thereby reducing cost and alignment complexity. However, conventionally, a light cone having a smaller F# is used in projection systems, since system designs are directed to maximizing brightness.

As is another well known principle applied in the design of projection apparatus, it is beneficial to minimize the retrofocus distance of projection lens 32, thus minimizing the working distance requirements and cost of projection lens 32. It would be preferable to avoid the cost and complexity requirements of a projection lens having a long back focal length relative to its effective focal length, such as the solution disclosed in U.S. Pat. No. 6,008,951 (Anderson), for example.

U.S. Pat. No. 5,944,401 (Murakami et al.) discloses, as an alternative to X-cube dichroics, a V-prism optical block comprising dichroic surfaces within plastic prisms. This solution provides some relief for back working distance requirements, since the refractive index of plastics exceeds that of air. To minimize back working distance, transmissive spatial light modulators are employed, allowing image-formation as close to the combining optical block as possible. However, this arrangement would not be well-suited for projector apparatus using reflective spatial light modulators, since back working distance requirements are still excessive. In terms of back working distance, the solution of U.S. Pat. No. 5,944,401 is not advantaged over conventional X-cube designs. A sizable projection lens would be required for full-scale cinema projection. Moreover, the solution disclosed in U.S. Pat. No. 5,944,401 does not address the inherent angular limitations of dichroic surfaces described above. Thus, brightness levels are constrained with this type of design solution.

U.S. Pat. No. 5,597,222 (Doany et al.) discloses, for use in a digital projector, an optical relay lens system that alleviates some of the difficulties noted above that relate to inherent tolerance problems and projection lens working requirements. U.S. Pat. No. 5,597,222 discloses the use of a single 1X, double-telecentric relay lens to relay the combined image from individual RGB color paths to a MacNeille polarizing beamsplitter (PBS), also termed a polarization beamsplitter. In U.S. Pat. No. 5,597,222 spatial light modulators are disposed very near a dichroic combiner X-cube, to minimize thereby some of the potential adverse effects of imperfections in outer surface flatness and tolerance errors in inner surface fabrication. The system disclosed in U.S. Pat. No. 5,597,222 is advantaged in that the design of its projection lens is simplified when compared with similar designs. The working distance requirements for the projection lens are significantly reduced using the design approach of U.S. Pat. No. 5,597,222. The single 1X double telecentric relay provides the necessary working distance to allow insertion of the MacNeille PBS prior to the intermediate internal combined image in the image path. The projection lens can then re-image this internal image to the screen without the requirements for long working distance that are typically required when using a PBS and/or a dichroic color combiner, such as an X-prism.

The solution presented in U.S. Pat. No. 5,597,222, however, falls far short of what is needed to compensate for inherent problems with X-cube coatings and surfaces so that both image brightness and color gamut can be maintained. For example, the design noted in U.S. Pat. No. 5,597,222 fails to address inherent angular dependencies in the dichroic coating response, so that it remains difficult to support a large color gamut while maintaining image brightness at the same time. Moreover, the projection lens must also use a high numerical aperture with this design, which implies added cost over designs with lower numerical aperture. Because of the scale of spatial light modulator components, the design of U.S. Pat. No. 5,597,222 is still very dependent on high-quality X-cube design. Further, the arrangement disclosed in U.S. Pat. No. 5,597,222 employs a relatively large number of optical components between a polarizing beamsplitter and its modulating LCD. With a large number of optical components in the path of a polarized illumination source, some unavoidable stress birefringence would necessarily alter the polarization states of both unmodulated and modulated light traveling in both directions, resulting in loss of image contrast.

U.S. Pat. No. 5,357,289 (Konno et al.) discloses a system that is similar to that disclosed U.S. Pat. No. 5,597,222, as it uses a single 1X relay lens to present an internal intermediate image to the projection lens, thereby significantly reducing the working distance requirements imposed on projection lens design. U.S. Pat. No. 5,357,289 provides an alternate construction to that shown in U.S. Pat. No. 5,597,222 for using polarization and color combining prisms. In the apparatus of U.S. Pat. No. 5,357,289, both the polarizing and color-combining prism are in the vicinity of the spatial light modulators, rather than spaced well apart, as in the apparatus of U.S. Pat. No. 5,597,222. Instead of the conventional X-prism, the apparatus of U.S. Pat. No. 5,357,289 uses a V-prism as a color combiner, where the V-prism is similar to that disclosed in U.S. Pat. No. 5,944,401 described above. The V-prism approach avoids some of the inherent problems with X-cube fabrication and use. While the approach disclosed in U.S. Pat. No. 5,357,289 eases the demands on projection lens design, the imaging relay (first lens group) presents a challenge, since it must provide a long working distance for the spatial light modulators and associated PBS and color-combining V-prism. As with the approach noted in U.S. Pat. No. 5,597,222, the approach shown in U.S. Pat. No. 5,357,289 uses a single imaging relay lens for all three colors (RGB), operating nominally at 1X magnification. As was seen with the U.S. Pat. No. 5,597,222 apparatus, the U.S. Pat. No. 5,357,289 approach requires a complex imaging relay lens that is fully color corrected over a broad part of the visible spectrum in order to form a white light image having minimal color aberrations or color differences in the third order aberrations, particularly with respect to distortion and defocus.

U.S. Pat. No. 6,247,816 (Cipolla et al.) discloses use of a 1X relay lens for relaying an intermediate image towards a dichroic combiner in only one of the color paths. The solution in U.S. Pat. No. 6,247,816 addresses a component packaging problem, but does not alleviate any of the angular constraints imposed by dichroic combiner response. Neither does the solution in U.S. Pat. No. 6,247,816 provide any relief with respect to back working distance requirements of the projection lens.

U.S. Pat. No. 4,836,649 (Ledebuhr et al.) discloses a projector system that uses internal imaging in both the illumination and imaging paths. The system utilizes nominally 1X imaging relays, with the portion of the relays used to interface to the light valves is common to both the illumination and imaging paths. The cited advantages of this architecture are to minimize the size of polarization components and to help alleviate back working distance constraints for the projection lens. While this arrangement provides some advantages, the color-combining dichroic surfaces must still handle light at low F# values, resulting in reduced color gamut. Likewise, as the imaging relay directly provides an internal white light image, the imaging relay lens must be color corrected across the entire visible spectrum. Finally, the projection lens must also operate at a low F# when using this solution.

Thus, it can be seen that there is a need for improvement in digital projection optics design that alleviates the inherent angular limitations of dichroic coatings while providing maximum brightness and color gamut, minimizes the working distance requirements of projection optics, and allows a high F# for projection optics.

An optical system described in pending U.S. patent application Ser. No. 10/050,309 provides an optical configuration that alleviates many of the problems described previously. This system provides for a projection system that produces an internal white light image, by means of combining three color (RGB) intermediate images relayed by three optical systems and combined by a color combining prism. This system provides working distance advantages, as well as a reduced numerical aperture at the color combining prism, which improves the manufacturability of the prism. Although this system can be configured with various components, it provides superior performance when the color combining prism is a V-prism (similar to the V-prism described in U.S. Pat. No. 5,357,289) and the polarization beamsplitter is a wire grid polarizer (see U.S. Pat. No. 6,243,199 (Hansen et al.)). Although this system works remarkably well, including for high brightness projection applications such as digital cinema, there are opportunities both for improvements and extensions. In particular, the system of the present invention provides opportunities to have smaller and less expensive optical components, an easier opto-mechanical package, and a less difficult optical design. Other advantages will become apparent from the discussion of the system of the present invention.

SUMMARY OF THE INVENTION

Briefly, according to one aspect of the present invention a display apparatus comprises a light source for forming a beam of light. Illumination optics shapes and directs the beam of light and splitting means splits the beam of light into at least three color beams of light. A modulation optical system for each of the three color beams of light comprises a pre-polarizer, a wire grid beamsplitter, a reflective spatial light modulator, and a polarization analyzer. An imaging relay lens in each color provides an intermediate image of the reflective spatial light modulator from the modulated light for that color. A dichroic combiner recombines the modulated light for each given color, such that the multiple color beams form the respective intermediate images along a common optical axis to form a combined intermediate image. A projection lens images the combined intermediate image to a display screen. The electronic projection further comprises a imager field lens prior to each of the spatial light modulators to provide nominally telecentric light to the spatial light modulators.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 8 is a perspective view showing the construction of a polarization compensator, FIGS. 9a-9d show the possible axial orientations of birefringence;

FIGS. 11a and 11b are schematic block diagrams of alternate modulation optical systems in accordance with the present invention;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
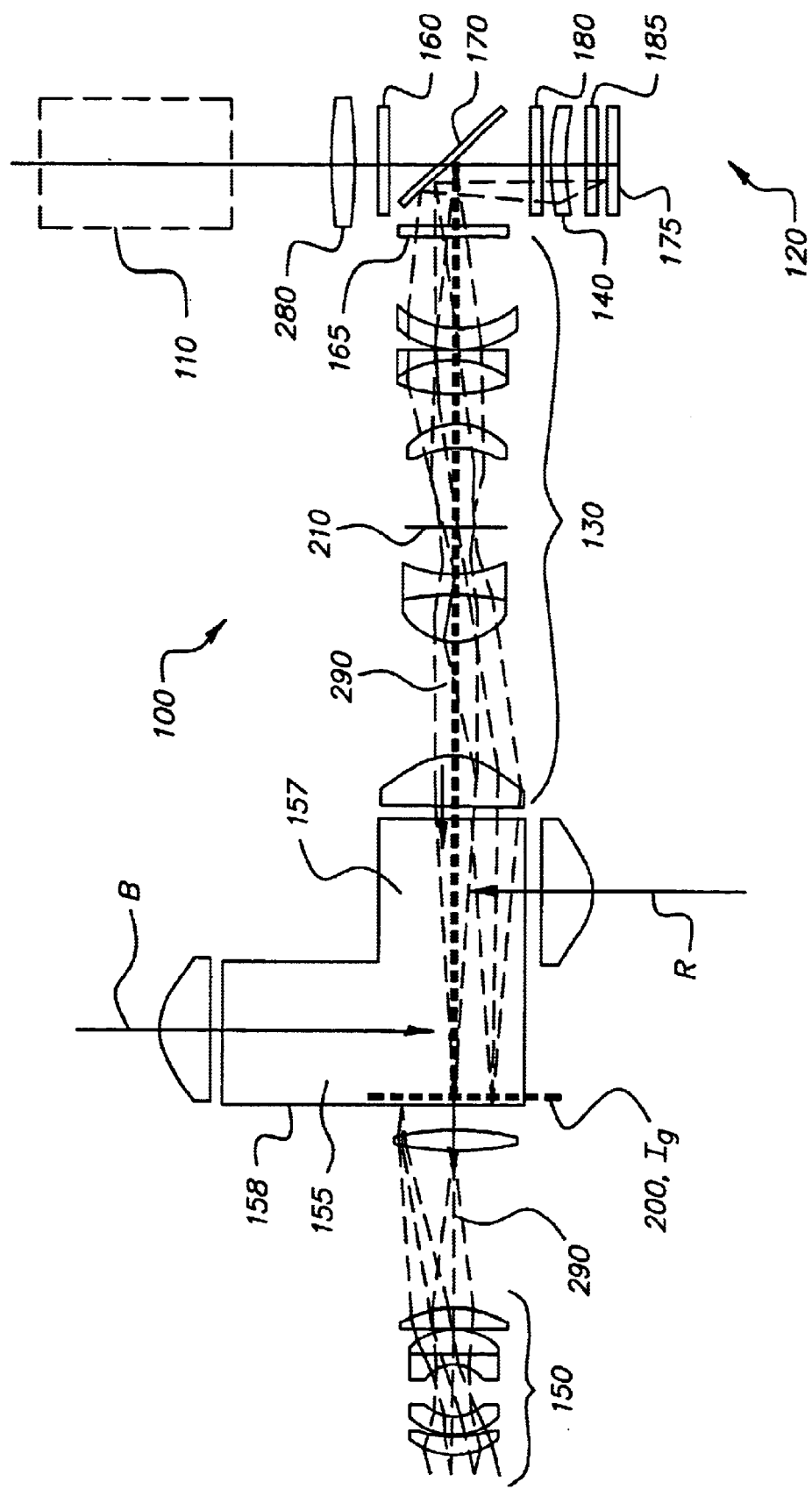
FIG. 2 is a schematic block diagram showing the major components of the modulation and imaging potions of the electronic projection system of the present invention.

Referring to FIG. 2, there is shown, in schematic form, a preferred implementation of components used in the in the imaging optical path of the electronic projection system 100 of the present invention. In particular, FIG. 2 illustrates the basic elements of the imaging system, including a modulation optical system 120, imaging relay lens 130, dichroic combiner 155, and projection lens 150. The illumination system 110 is represented in FIG. 2 in simplified form primarily by illumination lens 280. FIG. 2 illustrates these basic elements for the green color channel only, and the presence of the red and blue color channels is indicated only by the labeled arrows directed into dichroic combiner 155. In each color channel, the optical system includes an imaging relay lens 130 that provides an internal image 200. Internal image 200 is preferably a real image ($I_g$ for the green channel) of the corresponding spatial light modulator 175, that is also preferably magnified at a magnification Rx. In order to form a magnified real image $I_g$, imaging relay lens 130 magnifies, as its optical object, the image that is located on spatial light modulator 175 and reflected from wire grid polarization beamsplitter 170. Imaging relay lens 130 is nominally double-telecentric, such that it collects nominally telecentric light at the spatial light modulator 175, and outputs an image residing in nominally telecentric space. The image light that emerges from imaging relay lens 130 is directed along optical axis 290 and into dichroic combiner 155. Because dichroic combiner 155 handles telecentric light, there is minimal tendency for color shading across magnified real image $I_g$ (or $I_r$, and $I_b$, for the respective red and blue channels) due to angular variances. Dichroic combiner 155 is preferentially a V-prism, as depicted in FIG. 2, but it could also be an X-prism (or X-Cube), crossed dichroic plates, a Philips prism, or other combination of dichroic surfaces. Dichroic combiner 155 may also be fabricated from amorphous fused silica or other low stress glass, if the concerns for contrast loss, or color or contrast shading, warrant the added cost.

The optical configuration of the projector 100 of FIG. 2 is similar to the system described in pending U.S. patent application Ser. No. 10/050,309. This new system can share many of the same significant advantages that are provided by the system of the prior application. For example, by magnifying the image formed on spatial light modulator 175 with some magnification factor Rx>1X, imaging relay lenses 130 also effectively focuses the respective magnified real images $I_r$, $I_g$, or $I_b$ toward dichroic combiner 155 at a larger F# than 1X relay operation would provide. As an example, projection system 100 can be designed to operate at F/2.3 at the spatial light modulator 175, and with imaging relay lens 130 providing Rx=2X magnification, the speed at the dichroic combiner 155 is reduced to F/4.6. As a result, dichroic combiner 155 can be designed with internal dichroic coatings on internal surfaces 157 with sharper cut-offs, and therefore narrower spectral bands and a larger color gamut than would be achievable under a lower F#. Moreover, with the use of imaging relay lens 130, no light is lost even though a higher F# is achieved at dichroic combiner 155, since a low F# is still used at spatial light modulator 175. As a result, an improved magnified real image $I_r$, $I_g$, or $I_b$ are provided, as the output of dichroic combiner 155, along a common optical axis 290 and into projection lens 150. These images are overlapped to form a registered white light image.

Figure 1:
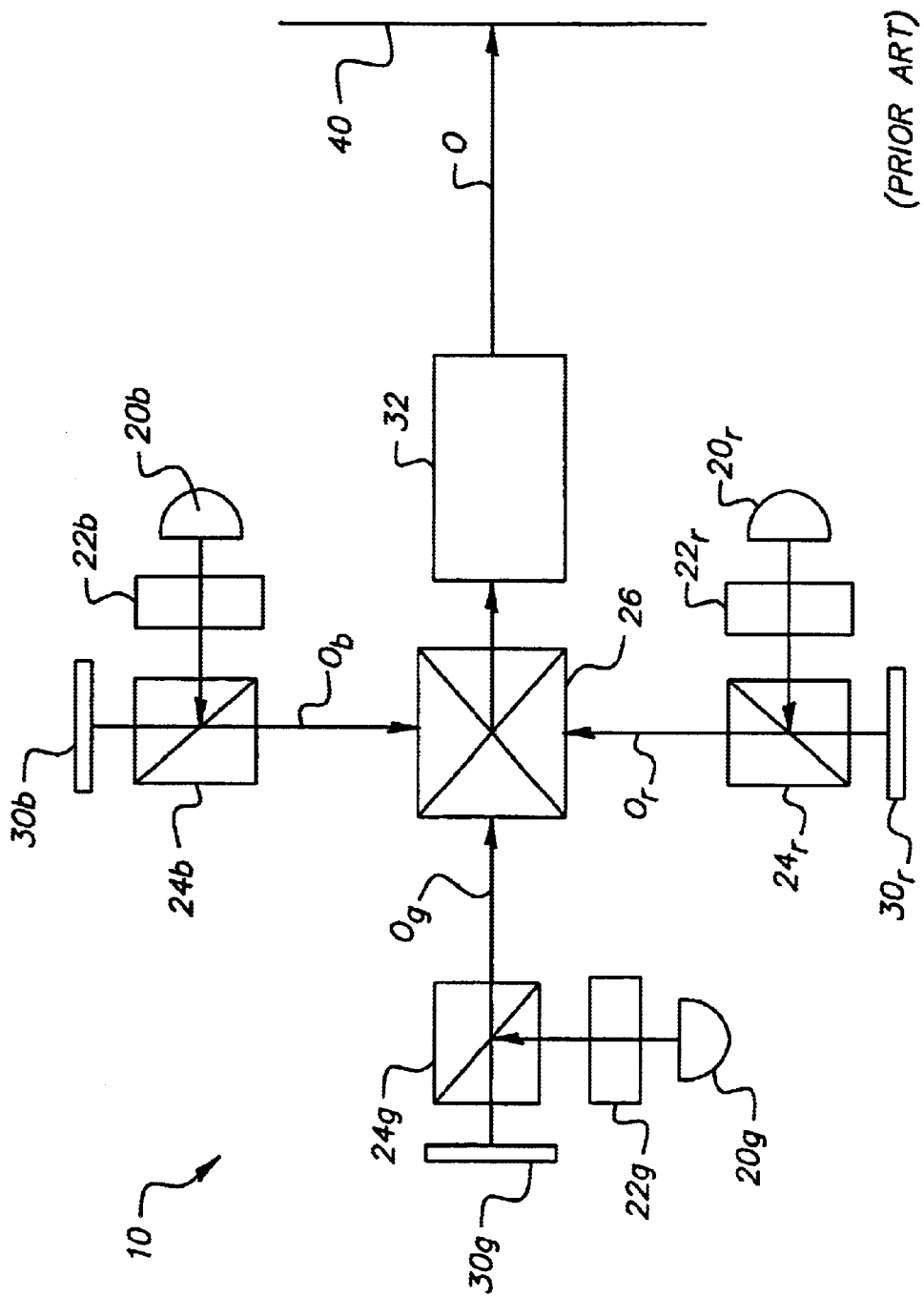
FIG. 1 is a schematic block diagram showing major components of a conventional, prior art digital projection apparatus.

Again, like the system discussed in the prior application, the arrangement of FIG. 2 also provides advantages for lowering cost and complexity requirements of projection lens 150. With the arrangement of FIG. 2, projection lens 150 can advantageously work at a higher F# in order to project the multicolor image (I) combined from each magnified real image $I_r$, $I_g$, or $I_b$ onto display surface 40 (not shown in FIG. 2). In addition, projection lens 150 needs only a small working distance to project the multicolor image (I) combined from each magnified real image $I_r$, $I_g$, or $I_b$ onto display surface 40, as this internal image can be placed near the exit face 158 of dichroic combiner 155. The use of the imaging relay lens 130 separates the polarization beamsplitter and the dichroic combiner, so that they are not adjacent, as is common in many standard electronic projectors. In such systems (such as FIG. 1), the projection lens 32 suffers a long working distance, as it must look through both the polarization beamsplitter 24 and the dichroic combiner 26. By comparison, the short working distance provided for the projection lens 150 of the projector 100 of FIG. 2, means that the lens elements within projection lens 150 can be small, despite the large F#. The projection lens design can then be simplified, to have comparable complexity to the everyday cinema projection lenses used in motion picture film projectors. The projection lens 150 can advantageously work at a higher F# in order to project a multicolor image combined from magnified multicolor real image I than would otherwise be possible. Projection lens 150 can be, for example, a simple 5- to 7-element lens assembly that employs commonly available optical glass and is comparable in cost and complexity to commercially available cinema projection lenses used with motion picture film projection apparatus. This is in contrast to conventional digital cinema and large-scale electronic projection systems that typically require complex and costly projection lenses. The net savings for the projection lens can be ~10X, when compared to the projection lenses designed for competitive digital cinema projection systems. Similar cost advantages can also be provided for any anamorphic attachment lens used with projector 100.

Furthermore, if the imaging relay lenses 130 provide enlarged images $I_r$, $I_g$, or $I_b$ to dichroic combiner 155, then dichroic combiner 155 is larger than it would be if 1X magnification had been used. However, even with 2X magnification, dichroic combiner 155 can be both smaller and cheaper than the comparable component used in standard prior art projection systems (see again FIG. 1). Prior art implementations for projection systems with intermediate images, such as those disclosed in U.S. Pat. Nos. 5,597,222 and 6,247,816 that were cited previously, do not provide systems with three imaging relays (one per color) utilized to form a common image projected along a common optical axis, as does the system of the present invention. Likewise, these prior art patents also do not provide three magnifying imaging relays operating at a greater than unity magnification, such as 2X.

The projector 100 of the present invention differs most significantly from the system described in the copending application (U.S. patent application Ser. No. 10/050,309) mentioned previously, because of the inclusion of imager field lens 140. Imager field lens 140 is provided as part of imaging relay lens 130, with the resulting principal advantage that the imaging relay lens 130 is easier to design, has smaller lens elements, and thereby has reduced cost and complexity compared to the equivalent lens provided in the prior patent application. Preferentially, the spatial light modulator (or imager) 175 resides in nominally telecentric space, such that both the incident illumination light and the reflected outgoing modulated light are telecentric (chief rays parallel normal to the modulator). Imager field lens 140 is then preferably placed in close proximity to the spatial light modulator 175, such that imager field lens 140 directs the chief rays collected from the off axis field points in a convergent manner into the main portion of imaging relay lens 130. Imager field lens 140 is also intrinsically part of the illumination system 110, with the other optical elements of said illumination system presenting a uniform field of light of the appropriate size and aspect ratio towards the spatial light modulator 175, with imager field lens 140 modifying this illumination light to be telecentrically incident. This will be explained in greater detail in the discussion of the illumination system (see FIG. 4). Finally, imager field lens 140 is also an intrinsic part of modulation optical system 120, as it can affect the polarization contrast response both through the polarization beamsplitter and across the field of the spatial light modulator. The prior art projection systems with internal intermediate images, including the systems disclosed in U.S. Pat. Nos. 5,597,222 and 6,247,816, do not disclose the use of an imager field lens 140 or equivalent, nor do they anticipate either the advantages or the problems and solutions that result from the use of this component in a projection system.

Figure 3:
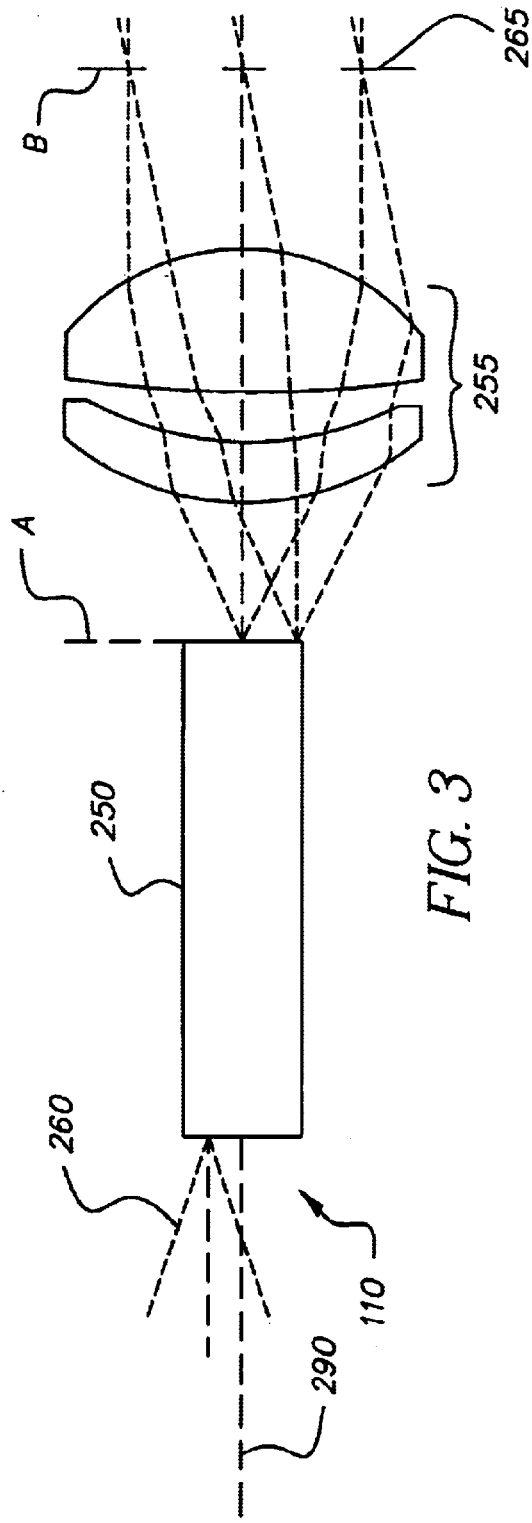
FIG. 3 is a schematic diagram of a portion of an illumination optical system appropriate for use in the electronic projection system of the present invention.

While FIG. 2 provided a reduced view of an illumination system 110 appropriate for projector 100, depicting only imager field lens 140 and a single illumination lens 280, the illumination system 110 is actually more complicated than that. Referring to FIG. 3, light from a polychromatic light source (not shown) is directed as focused source light 260 into an integrating bar 250. The light source is typically a lamp, such as a Xenon arc lamp, but it could also be some other type of high-intensity light emitter. In a typical lamp, the light emitter (arc, plasma, or filament) is located within a reflector (typically elliptical or parabolic in profile) and a consolidated light beam is provided as output. This light beam is then incident, directly or indirectly, into the uniformizing optics. In a preferred embodiment, the incident light is provided as focused source light 260 into integrating bar 250, which serves as the uniformizing optics. The focused source light 260 can be approximated as telecentrically incident (parallel to the local optical axis 290) to integrating bar 250. Well-known in the optical design art, integrating bars, also termed light-mixing bars, use total internal reflection (TIR) effects to homogenize incident light, thereby providing a spatially uniform plane of illumination. Other options for uniformizing optics include a diffusing screen, an integrating tunnel, a fiber optic faceplate, an incoherent fiber optic bundle, or a lenslet array, such as a fly's eye integrator assembly. In general, the uniformizing optics provides a uniform plane of light, which for the integrating bar 250 of FIG. 3, would occur at its output at plane A. The definition or tolerance for illumination uniformity is relative, and typically a gradual fall-off in illumination intensity from center to edge of 10–15% is acceptable.

Figure 4:
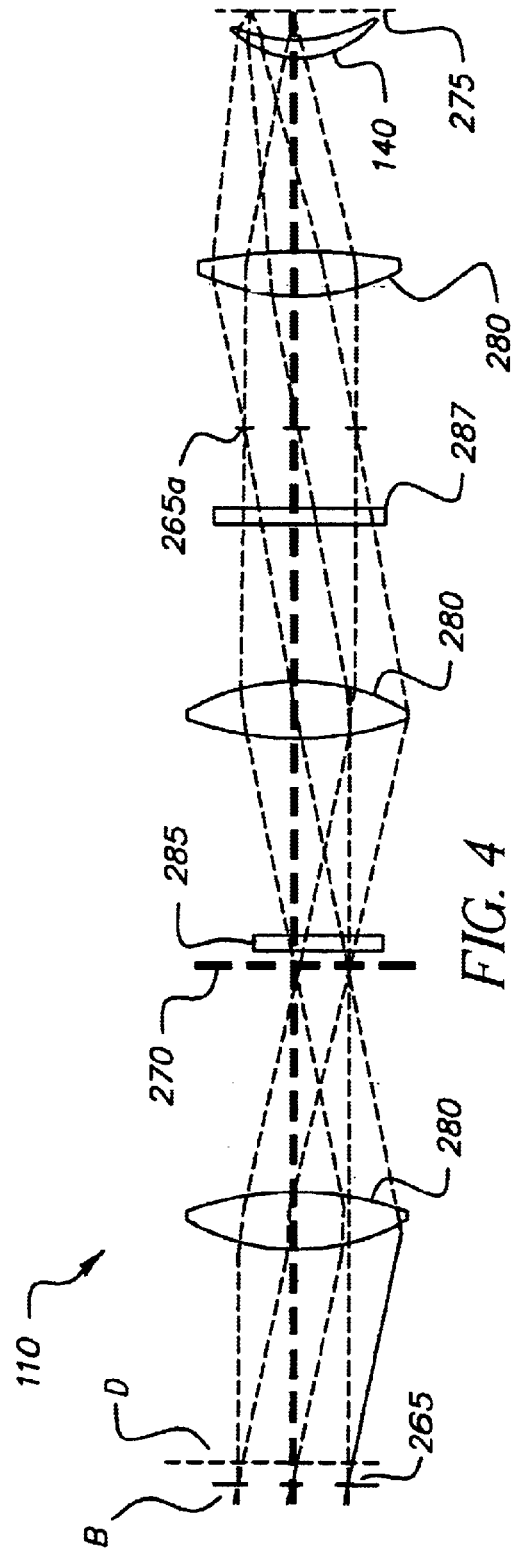
FIG. 4 is a schematic diagram of another portion of an illumination system appropriate for use in the electronic projection system of the present invention.

The illumination optics 110 can then be constructed a variety of ways, to transfer the light from the exit face at plane A of the integrating bar 250 to incidence at the imager plane 275. The partial illumination system depicted in FIG. 3 shows the integrating bar 250, and a base condenser lens 255, which presents light to an illumination aperture stop 265 at plane B. The illumination system is continued, as depicted in FIG. 4, with a series of illumination lenses 280 (which may or may not be identical), and imager field lens 140. (Although FIGS. 3 and 4 in combination illustrate an illumination system more completely, the two illustrations are not on the same scale.) In the system of FIG. 4, the exit face at plane A of integrating bar 250 is re-imaged to an internal illumination image 270, which is subsequently re-imaged to the imager plane 275. The illumination light is nominally telecentric at both the internal illumination image 270 and imager plane 275. This illumination system provides both an illumination aperture stop 265 at plane B, and a re-imaged illumination aperture stop 265a. A physical stop (such as an iris) can be placed at one or both of these planes to control the numerical aperture of the illumination light incident to the imager plane 275. The base condenser 255 and the illumination lenses 280 in combination direct an image of the nominally uniform light at exit face A of integrating bar 250 towards the imager plane 275. Imager field lens 140 most importantly contributes to make this illumination light nominally telecentric to the imager plane 275. Imager field lens 140 also makes a small contribution to the overall magnification from the exit face A of the integrating bar 250 to the imager plane 275. Typically, the illumination light will slightly overfill the active area (image area) of the spatial light modulator 175 placed at imager plane 275.

The system of FIG. 4 is simplified to show a single color channel, and does not depict a dichroic separator, except by the dashed line labeled "D". A dichroic separator, which splits the white light beam emerging from light uniformizing optics into three color beams (nominally red, green, and blue light beams, respectively) can be an X-prism (similar to dichroic combiner 26 depicted in FIG. 1) or a V-prism (similar to dichroic combiner 155 depicted in FIG. 2). In the partial illumination system of FIG. 4, the dichroic separator can be located at or near the illumination aperture stop 265. By locating a dichroic separator at plane B, there is a potential problem that the inevitable angular response variation of the separator will be expressed as color shading across the pupil or aperture stop. Such color shading in angle space can become a spatial variation in the field later, if angular effects through the polarization beamsplitter or through the lens system (vignetting) then become color variant. This effect can be minimized by supplying the system with color filters 285 (nominally one per color channel), which are nominally located in normally incident or telecentric space, as shown in FIG. 4. Alternately, the dichroic separator can be located at or near the internal illumination image 270, which sees nominally telecentric light. As such, the field point will see an angle averaged color response of the dichroic separator. The illumination system 110 of FIG. 4 can also include optics, such as waveplates and mirrors, which are depicted generally as other optics 287, and which modify the polarization orientation or propagation direction of the light per the design. Likewise, the illumination system 110 interacts with polarizers, polarization compensators, and the spatial light modulator, but those components are not depicted in FIG. 4 for simplicity.

An alternate illumination system can be understood by considering FIG. 4 further. In the illumination system 10 of FIG. 4 as generally depicted, the dichroic separator is nominally located at the illumination aperture stop 265, and the size of the internal illumination image 270 is of secondary importance. As a result, the size of the beam through the illumination aperture stop 265, and the angular spectrum of that beam, determine the design parameters for the dichroic separator. In this system the magnification N to the internal illumination image 270 in FIG. 4 can be small (N~1 to 2), so as to reduce the optical path length. On the other hand, the illumination system 110 can be configured differently, by changing the magnification to the internal illumination image 270 and then moving the dichroic separator. For example, the internal image of the exit face at plane A of the integrating bar 250 can be magnified by Nx, where for example, N~4.5. In this case, the spatial size and angular extent of the beam at the internal illumination image 270 determine the design of the dichroic separator. The color filters 285 are preferably located in telecentric space, and may immediately follow the dichroic separator. The key difference is that the first version provides room to place the dichroic separator at the aperture stop, while the second provides room to place it at the telecentric image. Depending on the system color tolerances and color gamut requirements, one or the other location/design may be favored.

Considering again the illumination system of FIGS. 3 and 4, a further variant illumination system is suggested. In particular, the second and third illumination lenses 280 could be removed, and the imager field lens 140 and imager plane 275 are then relocated to the vicinity of the plane identified in FIG. 4 as the internal illumination image 270. The illumination system is then more compact and simplified with the elimination of two or more illumination lens elements. In that case, it can however be difficult to provide sufficient room for the other optics (287) and mirror fold locations necessary to build a projector 100 that is compact in an overall sense.

Figure 5:
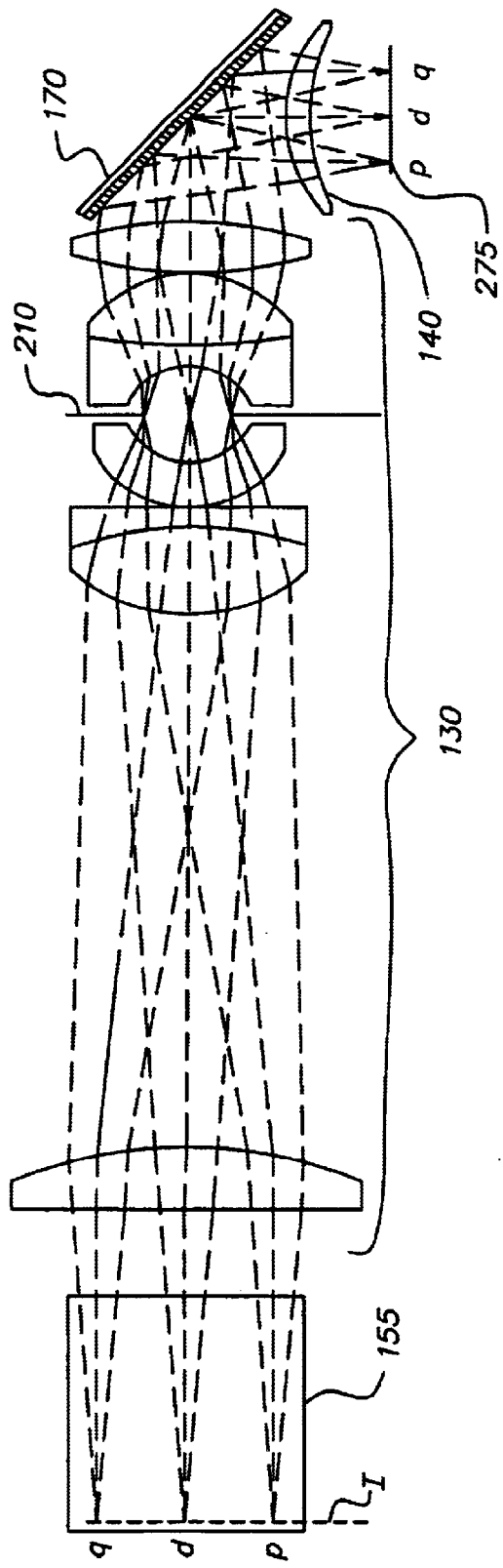
FIG. 5 is a schematic block diagram of an imaging relay lens optical system in accordance with the present invention.
Figure 6:
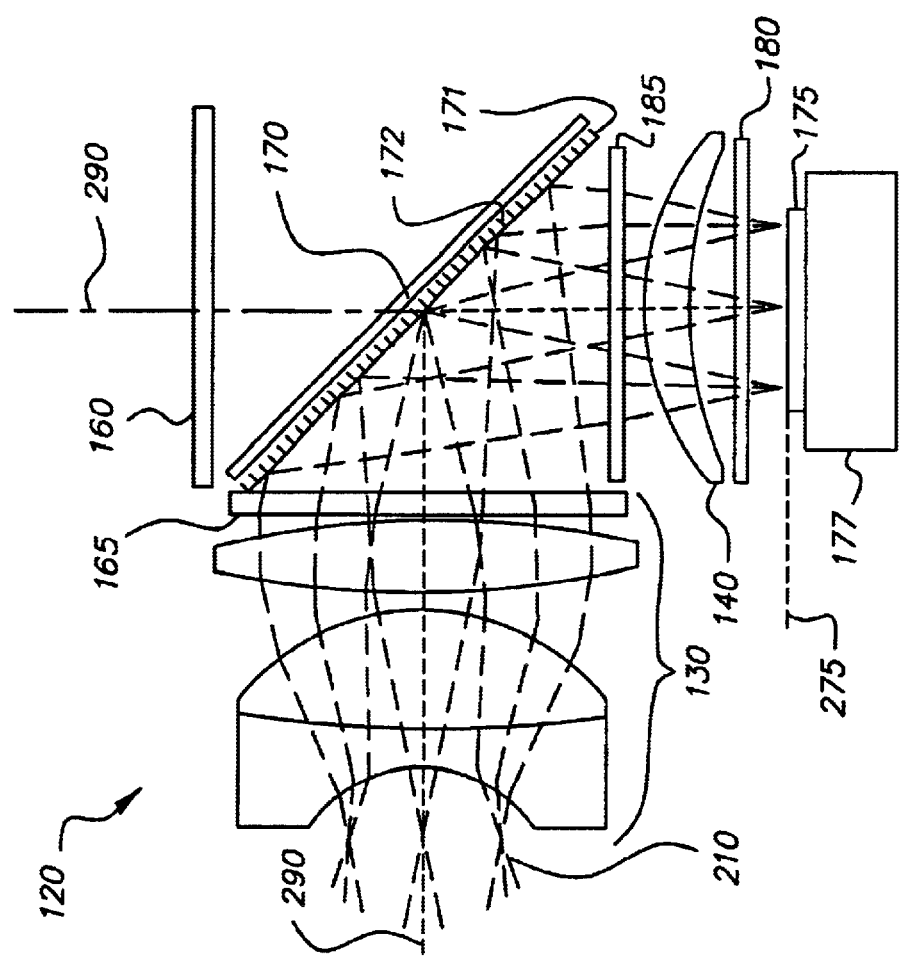
FIG. 6 is a schematic block diagram of a modulation optical system in accordance with the present invention.

The design of the projector 100 of the present invention can be better understood with reference to FIGS. 5 and 6, which show more accurate renderings of the imaging relay lens 130 and the modulation optical system 120 than is provided in FIG. 4. Accordingly, FIG. 5 shows an imaging relay lens 130, which comprises several lens elements, including the imager field lens 140. Letter markers "p", "d", "q" are provided to help track the imaging paths through the portion of the system depicted in FIG. 5, while "I" denotes the intermediate or internal image. FIG. 6 shows an expanded view of the modulation optical system 120, which includes the pre-polarizer 160, the polarization analyzer 165, the wire grid polarization beamsplitter 170, the spatial light modulator 175, the polarization compensators 180 and 185, and the imager field lens 140. Spatial light modulator 175, which is preferably an LCD, is nominally located at imager plane 275, such that a sharp image of the appropriate size is presented to the intermediate internal image I (see FIG. 5). Spatial light modulator 175 is shown mounted to a modulator package 177, which may include a heat sink, cooling means, and electrical connections to drive circuitry which provide the image data (all not shown). For context, FIG. 6 also shows a portion of the imaging relay lens 130.

In the preferred embodiment, imaging relay lens 130 is double-telecentric and forms a magnified intermediate (or internal) real image I of the image plane 275 near or within dichroic combiner 155. In that case, because dichroic combiner 155 handles telecentric light, there is minimal tendency for color shading across magnified real image I due to angular variances. Significantly, by magnifying the image provided at the imager plane 275 with some magnification factor (Rx) greater than 1X, imaging relay lens 130 also effectively focuses magnified real image I at a higher F# than 1X relay operation would provide. The design of imaging relay lens 130, including imager field lens 140, with a magnification Rx>1X is also preferable because the field angle collected at the spatial light modulator 175 is separate/different than the field angle at the display surface (screen). This means the field supported at the modulator can be chosen with consideration to the angular performance of the polarization beamsplitter, rather than being dictated by the field angle needed to the final projected image. The actual system depicted in FIG. 5 is representative of an imaging relay lens 130 providing Rx=2X magnification, such that F/2.3 light at the imager plane 275 is F/4.6 at the dichroic combiner 155.

The projector 100 and imaging relay lens 130 are still significantly advantaged compared to the pending patent application (U.S. patent application Ser. No. 10/050,309) due to the presence of imager field lens 140. In that prior system, the lens elements of the equivalent imaging relay lens were larger because image light propagated telecentrically from the imager plane 275, through the polarization compensators, off the polarization beamsplitter, through the polarization analyzer, before the first lens element was encountered. In one design of an imaging relay lens used in the prior application, one or more aspheric lens elements were used to reduce the lens aberrations experienced because of the large fast optical beams involved. By comparison, an imaging relay lens 130 designed with an imager field lens 140 provides for a smaller overall lens assembly, that does not require aspheric lens elements to obtain the comparable performance. Although a projector 100 of the present invention is enhanced by having the imaging relay lenses 130 provide enlarged images of the imager planes 275 with magnifications Rx>1X (for various reasons, as given previously), improvements can still be provided to the projector design even if it has unity magnification (Rx~1X). In particular, as the overall projector is assembled with three nominally identical imaging relay lenses 130 (one per color), the reduced size and cost resulting from a design with an imager field lens 140 provides for a more compact and less expensive projector.

As shown in FIG. 5, imager field lens 140 has modest optical power, and it directs the chief rays towards an imaging aperture stop 210 located downstream of the wire grid polarization beamsplitter 170. The precise location of the imaging aperture stop 210 is primarily determined by the optical design, relative to minimizing optical aberrations that would degrade image quality and also reducing the cost and complexity of the imaging relay lens 130. One natural form for the imaging relay lens 130 is a "double gauss" lens type, as depicted in FIG. 5. Certainly, the location of the imaging aperture stop 210 can be moved around by design. For example, if the imager field lens 140 was provided with significant optical power, the imaging aperture stop could be located in the vicinity of the wire grid polarization beamsplitter 170. Such a design would likely be of little benefit, as the imager field lens 140 would be quite fast, and the illumination system would be required to work with an aperture stop in an awkward location. Additionally, the angular response requirements imposed on the polarization beamsplitter (in general, or for a wire grid polarization beamsplitter in particular), would be significantly more demanding.

It should be noted that as the electronic projection system 100 of the present invention utilizes a series of intermediate internal images, both in the illumination and imaging systems, the various image planes have accompanying aperture stop planes. These include the illumination aperture stop 265, the re-imaged illumination aperture stop 265a (see FIG. 4), the imaging aperture stop 210 (see FIGS. 2 and 5), and an aperture stop (shown un-numbered in FIG. 2) within projection lens 150. For example, the aperture stop within the projection lens 150 can be the actual limiting aperture stop for the entire optical system that sets the imaging F#. One of the illumination aperture stops (265 or 265a) may define a near-to-the-limit angular extent, allowing a little angular overfilling of the spatial light modulator 175. In this way, light that has emerged from the integrating bar 250 and is traversing the optical path at angles beyond those chosen for imaging, can be removed at location where any resulting heat can also readily be removed.

As a design approach useful for electronic projection systems, a specific design comprising imaging relay lenses 130, that provide internal or intermediate images (I), and utilize a field lens 140 adjacent to the spatial light modulator 175, is novel. Notably however, the use of field lenses near the spatial light modulators (imagers) in electronic projector designs has generally been avoided. This is particularly true in systems that utilize spatial light modulators, such as liquid crystal displays (LCDs), which are polarization based in modulation. The polarization response of the system, and the resulting frame sequential contrast provided by the projector, are largely determined by the response of the LCDs, the various polarizers, and the polarization compensators. In such systems, it is good general practice to minimize the number of optics in the optical path between the LCD and the last polarization contrast component (typically the polarization analyzer). This is because any stress on such extra optics, whether mechanical mounting or fabrication stress, or thermally induced stress, can cause stress birefringence. As birefringence is a directional variation in refractive index, and is a polarization sensitive phenomenon, stress birefringence can alter polarization states and affect contrast. Depending on the system configuration, uniform losses in contrast and/or spatially variant losses in contrast can occur. Also, as the use of field lenses near the imagers (spatial light modulators) increases the range of angles through the polarizers, the use of such field lenses has been generally avoided because of the limited angular responses available from conventional visible wavelength polarization beamsplitters.

The preferred embodiment for the modulation optical system 120 portion of projector 100 is depicted in FIG. 6, and includes the pre-polarizer 160, the polarization analyzer 165, the wire grid polarization beamsplitter 170, the spatial light modulator 175, the polarization compensators 180 and 185, and the imager field lens 140. In constructing a modulation optical system 120 using an imager field lens 140, it is obviously preferable to use a polarization beamsplitter with a wide angular response, so at to handle the combination of the imaging speed (F#) and the field convergence angle introduced by the imager field lens 140. While various polarization beamsplitter technologies can be considered for high speed (small F#), high contrast, high optical efficiency systems, the wire grid polarization beams splitter from Moxtek Inc. of Orem, Utah is a superior candidate.

In several related pending patent applications cited previously (U.S. patent application Ser. Nos. 09/813,207, 10/040,663, and 10/050,309) modulation optical systems 120 using wire grid polarizers have been disclosed. The design and attributes of the modulation optical system (also referred to as an "optical core" in industry parlance) are critical to the projector design, as it determines the frame sequential contrast, or the modulation between the On and Off states from one image frame to the next. In particular, the first application Ser. No. (09/813,207) describes a modulation optical system 120 similar to that shown in FIG. 7 comprising a pre-polarizer 160, a polarization analyzer 165, a wire grid polarization beamsplitter 170, a spatial light modulator 175, and a polarization compensator 180. Among other things, this application teaches that to attain its goal of >1,000:1 frame sequential contrast, the modulation optical system 120 is optimally configured with the sub-wavelength wires 171 of the wire grid polarization beamsplitter 170 facing the spatial light modulator 175. This application further teaches that for optimal contrast, spatial light modulator 175 is a LCD employing vertically aligned LC molecules. The second application Ser. No. (10/040,663) teaches the design, use, and need for the modulation optical system 120 to be enhanced with a polarization compensator 180 optimized for operation in a system utilizing wire grid polarizers. However, neither of these applications anticipate the design of the modulation optical system 120 of FIG. 6, which has an imager field lens 140, and thus neither application anticipates the accompanying issues and potential problems. Aspects of the actual design of imager field lens 140 can depend on the polarization behavior of the neighboring optics, as well as on the polarization attributes of imager field lens 140 itself.

The contrast or polarization extinction properties of modulation optical system 120 obviously depend in large part on the transmitted and reflected responses of the constituent polarizers for the "s" and "p" polarization states of the incident light. Because the polarization response of all polarizers varies with both incidence angle and polarization state, it is important to provide adequate response over the range of angles (F#) used in the system. Otherwise, the higher angle light will likely contribute leakage from one polarization state into the other, and contrast will be reduced.

Contrast losses can also be significant for the oblique and skew rays traversing the polarization optical system. Oblique rays are those rays that fall in the four quadrants outside the extinction axes defined by the crossed polarizers, but which lie in planes that contain the local optical axis 290. The skew rays are the rays that lie in planes that do not contain the local optical axis 290.

In the original electronic projection systems that were developed utilizing reflective liquid crystal displays, each LCD was addressed from behind using a CRT. Today, state of the art reflective LCDs are directly electronically addressed by means of a silicon backplane. These modern devices, which are known as liquid crystal on silicon (LCOS) displays, generally comprise a silicon substrate, which is patterned with pixel addressing circuitry, overcoated with reflective and light blocking layers, followed by an LCD alignment layer, a thin (~3 $\mu$m) layer of liquid crystal, and an anti-reflection (AR) coated cover glass. The optical performance of a LCD depends on many design parameters, including the material properties of the liquid crystals, the electrode structure, the pixel patterning and proximity, the ON state and OFF state orientations of the liquid crystal molecules, the use and construction of the alignment layers, the optical properties of the reflective, anti-reflective, and light blocking layers, etc. For example, while the liquid crystal molecules are nominally vertical to the inside surfaces of the silicon substrate and the cover glass, in actuality the surface adjacent molecules are oriented with a residual tilt of 1–2 degrees from the normal. If this residual tilt angle becomes larger, device contrast starts to suffer. The net contrast provided by a modulation optical system can be degraded by various subtle effects within the LCDs (large tilt angles, bias voltages for the OFF state, thermally induced stresses, and large incident angles (large NA's)), as well as by the response variations of the polarizers themselves.

Certainly, polarization contrast can be potentially enhanced by making design changes to the actual polarization devices (the wire grid polarization beamsplitter and the LCDs) themselves. However, as it is not always possible or easy to alter the fundamental design, manufacturing, and performance limitations of these devices, alternate methods of improving contrast have been sought In particular, many projection and display systems have made use of polarization compensators of various designs.

Compensators and polarizers are constructed from birefringent materials, which have multiple indices of refraction. Comparatively, isotropic media (such as glass) have a single index of refraction, and uniaxial media (such as liquid crystals) have two indices of refraction. Optical materials may have up to three principle indices of refraction. The materials with all three different refractive indices are called biaxial, and are uniquely specified by its principal indices $nx_0$, $ny_0$, $nz_0$, and three orientational angles as shown in FIG. 9a. FIG. 9b shows a biaxial film with the axes of $nx_0$, $ny_0$, and $nz_0$ aligned with x, y, and z axes, respectively. The materials with two equal principal refractive indices are called uni-axial materials. These two equal indices are ordinary index and referred as $n_O$. The other different refractive index is called an extraordinary index $N_e$. The axis of $n_e$ is also referred to as an optical axis. Uniaxial materials are uniquely characterized by $n_e$, $n_o$, and two angles describing the orientation of its optical axis. When all three principal indices are equal, the materials are called isotropic. Light sees varying effective indices of refraction depending on the polarization direction of its electric field when traveling through a uniaxial or biaxial material, consequentially, a phase difference (retardance) is introduced between two eigen-modes of the electric field. This phase difference varies with the propagation direction of light, so the transmission of the light varies with angle when uniaxial or biaxial materials are placed between two crossed polarizers. These phase differences translate into modifications of the local polarization orientations for rays traveling along paths other than along or parallel to the optical axis. In particular, a compensator modifies or conditions the local polarization orientations for rays at large polar angles, which also includes both oblique and skew rays. A liquid crystal material is typically a uniaxial material. When it is sandwiched between two substrates as in a liquid crystal display, its optic axis generally changes across the thickness depending on the anchoring at the substrates and the voltage applied across the thickness. A compensator is constructed with one or more uniaxial and/or biaxial films, which are designed to introduce angularly dependent phase differences in a way to offset the angle dependence of phase difference introduced by liquid crystals or other optical elements. As is well known in the art, a uniaxial film with its optic axis parallel to the plane of the film is called a A-plate as shown in FIG. 9c, while a uniaxial film with its optic axis perpendicular to the plane of the film is called a C-plate, as shown in FIG. 9d. A uniaxial material with $n_c$ greater than $n_o$ is called positively birefringent. Likewise, a uniaxial material with $n_c$ smaller than $n_o$ is called negatively birefringent. Both A-plates and C-plates can be positive or negative depending on their $n_c$ and $n_o$.

A more sophisticated multi-layer polarization compensator 180 has its optic axis or three principal index axes varying across its thickness, as in FIG. 8, where a stack of compensation films (birefringent layers 190a, 190b, and 190c) are used with a substrate 195 to assemble the complete compensator. A detailed discussed of stack compensation can be found in U.S. Pat. No. 5,619,352 (Koch et al.). As is well known in art, C-plates can be fabricated by the use of uniaxially compressed polymers or casting acetate cellulose, while A-plates can be made by stretched polymer films such as polyvinyl alcohol or polycarbonate. For increased robustness, polarization compensators can be fabricated with inorganic materials rather than the more commonly used polymers.

Figure 7:
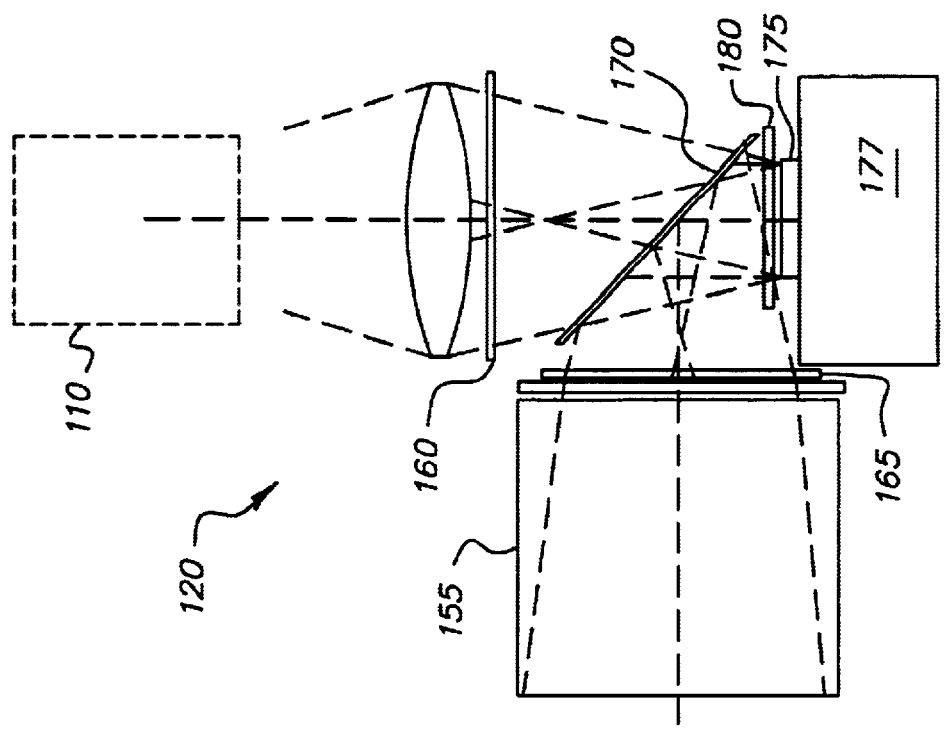
FIG. 7 is a schematic block diagram of a prior art modulation optical system.

In U.S. patent application Ser. No. 10/040,663, a modulation optical system 120 similar to that in FIG. 7 is discussed, wherein a polarization compensator 180 is described for operation in conjunction with a vertically aligned LCD and a wire grid polarization beamsplitter 170. As was described in that application, an exemplary compensator can have retardance designed to optimize the performance of the VA-LCD, the wire grid polarization beamsplitter, or both in combination. For example, the compensator can include an A-plate with 0.02λ's (~11 nm) retardance to correct for residual stress birefringence within the VA LCD, and a negative C-plate (approx. −233 nm retardance) to correct for incidence angle response variations when the LCD is operated in fast optical systems (F/3.0 or below). Likewise, as was discussed, a compensator can be provided for the wire grid polarization beamsplitter 170 comprising a combination of an A-plate and a positive C-plate having a retardation of +90 nm and +320 nm respectively. It was noted that the compensators for the wire grid polarization beamsplitter 170 and the LCD are co-located between these two components, and can be combined into one packaged compensator device. The combined compensator 180 then comprises the +11 nm A-plate for the VA LCD (0.02λ's compensation), a +87 nm C-plate, and a +90 nm A-plate for the wire grid polarization beamsplitter 170 in sequential order, with the +11 nm A-plate located closest to the LCD (175). The two A-plates cannot be simply combined, as the +11 nm A-plate needs to be rotatable, while the +90 nm A-plate has a fixed orientation relative to the sub-wavelength wires 171. However, previously stated, this prior application does not anticipate the use of an imager field lens 140 in a modulation optical system 120, nor its potential impact on contrast performance and the design of any neighboring polarization compensators.

Considering once again the modulation optical system 120 of the present invention, as depicted in FIG. 6, various techniques can be employed to enhance the frame sequential contrast in conjunction with the use of image field lens 140. As in the prior applications, wire grid polarization beamsplitter 170 is preferably oriented with its sub-wavelength wires 171 on substrate 172, facing the spatial light modulator 175. Likewise, for high contrast, it is preferable that spatial light modulator 175 is a liquid crystal display utilizing vertically aligned LC molecules, although other types of high contrast polarization modulators could be used. However, with specific regards to a modulation optical system 120 incorporating an imager field lens 140, frame sequential contrast can be readily maintained if image field lens 140 does not introduce any stress birefringence. If that is the case, light can traverse imager field lens 140 without incurring any rotation of the polarization vectors. As a result, the polarization compensator 180 and second polarization compensator 185 shown in FIG. 6 can be combined into one device, in a similar fashion to the compensator described in U.S. patent application Ser. No. 10/040,663. While the compensator could potentially be placed to either side of imager field lens 140, for mounting and contrast reasons, it will likely be located adjacent to the spatial light modulator 175. Although imager field lens 140 has optical power and therefore introduces phase change across its diameter, relative to the polarization contrast performance of modulation optical system 120, it is important that this lens introduces minimal phase retardation.

For most applications, including many polarization systems, many glasses may be sufficiently stress free to be utilized in a fashion similar to imager field lens 140. However, in an electronic projection system seeking high contrast (1,000:1 or greater) and high screen lumens, small amounts of de-polarization or polarization rotation, whether originating from intrinsic birefringence, or mechanically or thermally induced stress birefringence, can degrade the contrast. Moreover, as stress birefringence is frequently spatially non-uniform, a spatial contrast variation could result from stress in imager field lens 140.

Most optical glasses are amorphous (isotropic) or non-crystalline, and therefore lack intrinsic birefringence. Mechanically induced stress birefringence can be avoided by using symmetrical fabrication techniques and compliant mounting, which could be accomplished with a flexible adhesive, such as RTV. Thermally induced stress birefringence, as could occur from light absorption, can be minimized by choosing optical glasses with a low optical stress coefficient, a low absorption coefficient, or both. For example, SF-57 glass has the lowest stress coefficient of any optical glass, and has been used in electronic projection systems for that reason. However, SF-57 glass is expensive, hard to work, and has relatively high blue light absorption. Alternately, amorphous fused silica glass has the lowest light absorption across the visible spectrum, and has been used successfully in many projection systems. Even though its stress optical coefficient is not the lowest, the lack of heat from light absorption very effectively minimizes stress birefringence. Therefore, the imager field lens 140 used in the modulation optical system 120 of FIG. 6 is preferably made from a low stress or low absorption glass, and in particular, from amorphous fused silica.

Figure 12:
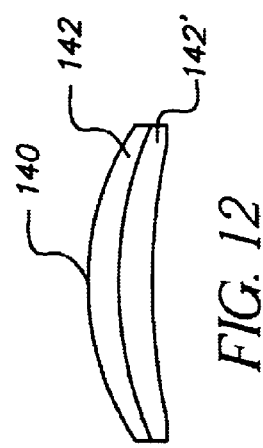
FIG. 12 is a schematic block diagram of an alternate configuration for the imager field lens.

Of course, even constructed from a preferred optical glass, imager field lens 140 may experience some residual birefringence that could impact the performance of a high contrast electronic projection system. In that case, it is preferable that this residual birefringence be uniform across the imager field lens 140. It is then possible to fabricate an imager field lens 140 where this residual stress has been cancelled out. Accordingly, FIG. 12 depicts an imager field lens 140 comprising two imager field lens elements 142 and 142'. In combination, these lenses would provide the total optical power required for imager field lens 140 as dictated by the optical design. The two imager field lens elements 142 and 142' are preferably fabricated from the same optical material. Thereafter, the birefringent axis of each lens element is independently determined, and then the lens elements are aligned with the axes oriented orthogonally to each other so as to cancel the residual retardances. The lens elements are then assembled to create imager field lens 140, preferably with a low stress optical adhesive. Optimally, the optimum retardance cancellation is achieved at the operating temperature.

As another approach, if imager field lens 140 provides a stable uniform amount of residual retardance, the polarization compensators 180 and 185 can be designed with in-plane (XY) and out-of-plane (Z) retardance A-plate and C-plate materials, to correct for the lens residual retardances. As a worst case, if imager field lens 140 has stable but non-uniform residual retardances, then one or both of the polarization compensators 180 and 185, as a correction, could be designed with matching, opposite sign, spatially variant retardances. However, producing spatially variant or patterned polarization compensators is a non-trivial complication.

In FIGS. 2 and 6, the modulation optical system of the present invention is shown to include a pre-polarizer 160. In the bright projection systems required for applications such as digital cinema, the lamps employed, such as xenon arc lamps, emit un-polarized light from a large emitting volume (large LaGrange or etendue). Typically in such systems, little can be done to salvage the light (50% of the total) of the polarization state rejected by the pre-polarizer. However, in many projection systems using smaller lamp sources, polarization converters can be used to convert a rejected polarization state to the orthogonal state, with the resulting polarized illumination light being directed at the spatial light modulator. In such a case, the pre-polarizer 160 shown in modulation optical system 120 of the present invention is effectively replaced, or substituted for, by the use of a polarization converter. Many forms of polarization converters are known in the art, including systems with large polarization beam splitting prisms and systems with microprism arrays (U.S. Pat. No. 5,555,186 (Shioya) and U.S. Pat. No. 5,898,521 (Okada), for example). It should also be understood that both the pre-polarizer 160 and the polarization analyzer 165 provided in modulation optical system 120 of the present invention may be selected from a variety of potential polarizer technologies, including wire grid polarizers, dye or polymer polarizers, thin film polarizers, or giant birefringence type polarizers.

Figure 10:
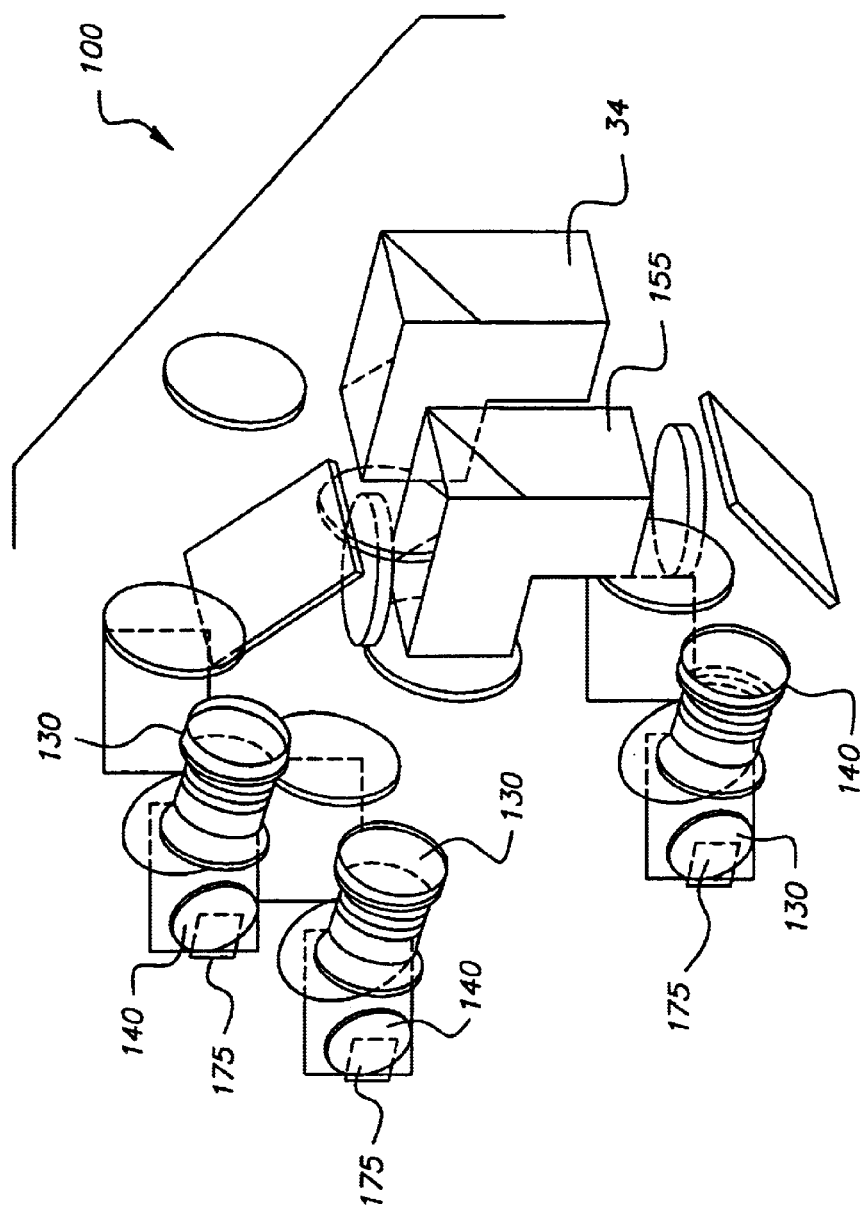
FIG. 10 is a perspective illustration of the electronic projection apparatus of the present invention.

As a means to assist in understanding the improved projector 100 of the present invention, FIG. 10 depicts a three dimensional view of the system, with many of the critical components of the imaging side of the system readily visible. In particular, this figure shows a nominal layout with three imaging systems (red, green, and blue), each partially comprising a spatial light modulator 175, an imager field lens 140, and an imaging relay lens 130. The illustration also shows a dichroic combiner 155 of the V-prism type, but the projection lens is not depicted. Portions of the illumination system, and particularly the dichroic separator 34, are shown, but much of the illumination system is obscured by the imaging optics shown in the foreground, or is not shown (such as the light source and integrating bar). Certainly the overall system can be configured many ways, and this illustration represents a compact construction, but not necessarily an configuration that is optimal overall.

The preferred embodiment for the modulation optical system 120, as shown in FIG. 6, utilizes a wire grid polarization beamsplitter 170 and reflective spatial light modulator 175. In this system, the illumination light is transmitted through the wire grid polarization beamsplitter 170 before being incident on the spatial light modulator 175. The modulated image light that emerges from spatial light modulator 175 then reflects off of wire grid polarization beamsplitter 170, before entering the main body of the projection lens 130. The un-modulated image light preferably is transmitted back through wire grid polarization beamsplitter 170 and is absorbed or rejected without returning as ghost or flare light. This approach provides high contrast, high optical efficiency, while incurring some manageable mechanically packaging constraints. Alternately, the modulation optical system 120 could be constructed as shown in FIG. 11a, where the illumination light reflects off the wire grid polarization beamsplitter 170 before being incident to the reflective spatial light modulator 175. In this case, the modulated image light that emerges from spatial light modulator 175 is transmitted through wire grid polarization beamsplitter 170, before entering the main body of the projection lens 130. Although this system provides an architecture with somewhat easier opto-mechanics, the imaging light that is transmitted through the wire grid polarization beamsplitter 170 suffers the classic aberrations induced by transmission through a tilted plate. Although these aberrations can be corrected, both the imaging relay lens 130 and the projection lens 150 may suffer increased complexity and cost.

The modulation optical system 120 of FIG. 11a also lends itself to an alternate configuration with a simplified opto-mechanical construction. In particular, the spatial light modulator 175 can be a transmissive device rather than a reflective device. In that case, pre-polarized illumination light would approach the spatial light modulator 175 from "behind" (from the right side of the spatial light modulator 175), and modulated and un-modulated light could be provided in accordance to the drive signals directed to each pixel. For such a transmissive system, the wire grid polarization beamsplitter 170 could be removed and polarization analyzer 165 retained, to provide a simplified and more compact optical path. Alternately, polarization analyzer 165 could be removed and wire grid polarization beamsplitter 170 retained, to provide a simplified system with potentially higher contrast than the previous case. Imager field lens 140 would still be used on the imaging side to help simplify the design of an image relay lens or projection lens downstream. A second imager field lens 140 could also be used on the illumination side of the transmissive spatial light modulator 125, although that would not be necessary.

As another alternative, modulation optical system 120 could be constructed as shown in FIG. 11b, with a polarization beamsplitter prism 173. The principal advantage of using a prism, as compared to the tilted plate beamsplitter provided in FIG. 6, is a reduced optical path length and therefore a reduced working distance requirement. In this case, polarizing beamsplitter prism 173 could for example be a conventional MacNeille beamsplitter (U.S. Pat. No. 2,403,731) or an embedded wire grid beamsplitter (U.S. Pat. No. 6,288,840 (Perkins et al.)). Other types of polarizers and polarization beamsplitters can be used in modulation optical system 120, including the 3M multi-layer polymer sheet polarization beamsplitter (U.S. Pat. No. 5,962,114 (Jonza et al.)), provided that the polarization response and thermal stability are adequate.

Figure 13:
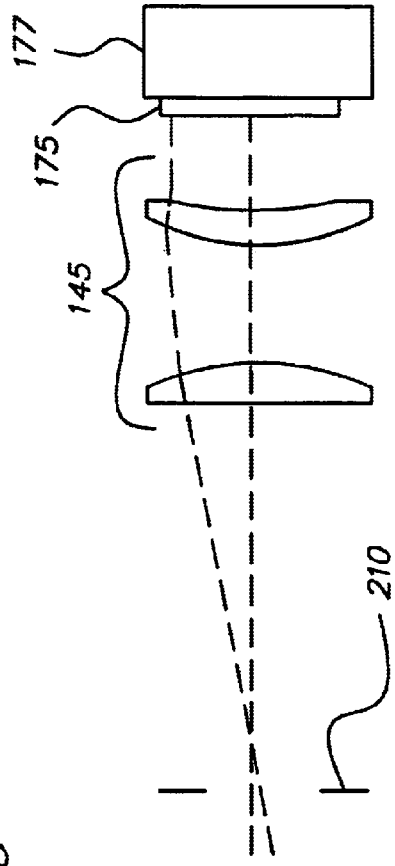
FIG. 13 is a schematic block diagram of a portion of an alternate optical design for the imaging relay lens and imager field lens provided for the electronic projection apparatus of the present invention.

A variation of the design for the imaging relay 130 lens depicted in greatest detail in FIG. 5 is to utilize a Ramsden eyepiece 145 type design, as depicted in FIG. 13. The classical Ramsden eyepiece is a two element design that provides an accessible aperture stop and an accessible field along with a modest angular field. For example, to use this in the projection system, the polarizing beamsplitting prism could be placed between the two lens elements of the Ramsden eyepiece, effectively identifying the lens element closest to spatial light modulator 175 as the imaging field lens 140. Assuming the dichroic combiner is located at or near a telecentric intermediate image, then an imaging relay lens could be designed incorporating the Ramsden eyepiece on one side of the imaging aperture stop 210, and other lens elements on the other side of the stop. To obtain better optical performance, other more complicated eyepiece designs, using 3 or more lens elements, can be designed. Some of these eyepiece designs will steer the overall design of the imaging relay lens 130 to take on a double gauss construction similar to that in FIG. 5, while other designs may steer the overall imaging relay lens 130 into a different solution space. A design using a Ramsden eyepiece, or variation thereof, may also provide the free space to locate the dichroic combiner at the imaging aperture stop 210, while the system design still provides an imaging relay lenses 130 to create an intermediate image (I). Again, the intermediate image (I) would be imaged to a display surface by a projection lens. This alternative may enable an even more compact projection system design than that provided with imaging relay lenses employing a double gauss configuration. The polarization beamsplitter could also be placed after the two lens elements of the Ramsden, rather than between them, but this further increases the number of elements between the beamsplitter and the spatial light modulator, which increases the potential for polarization contrast degradation.

Figure 14:
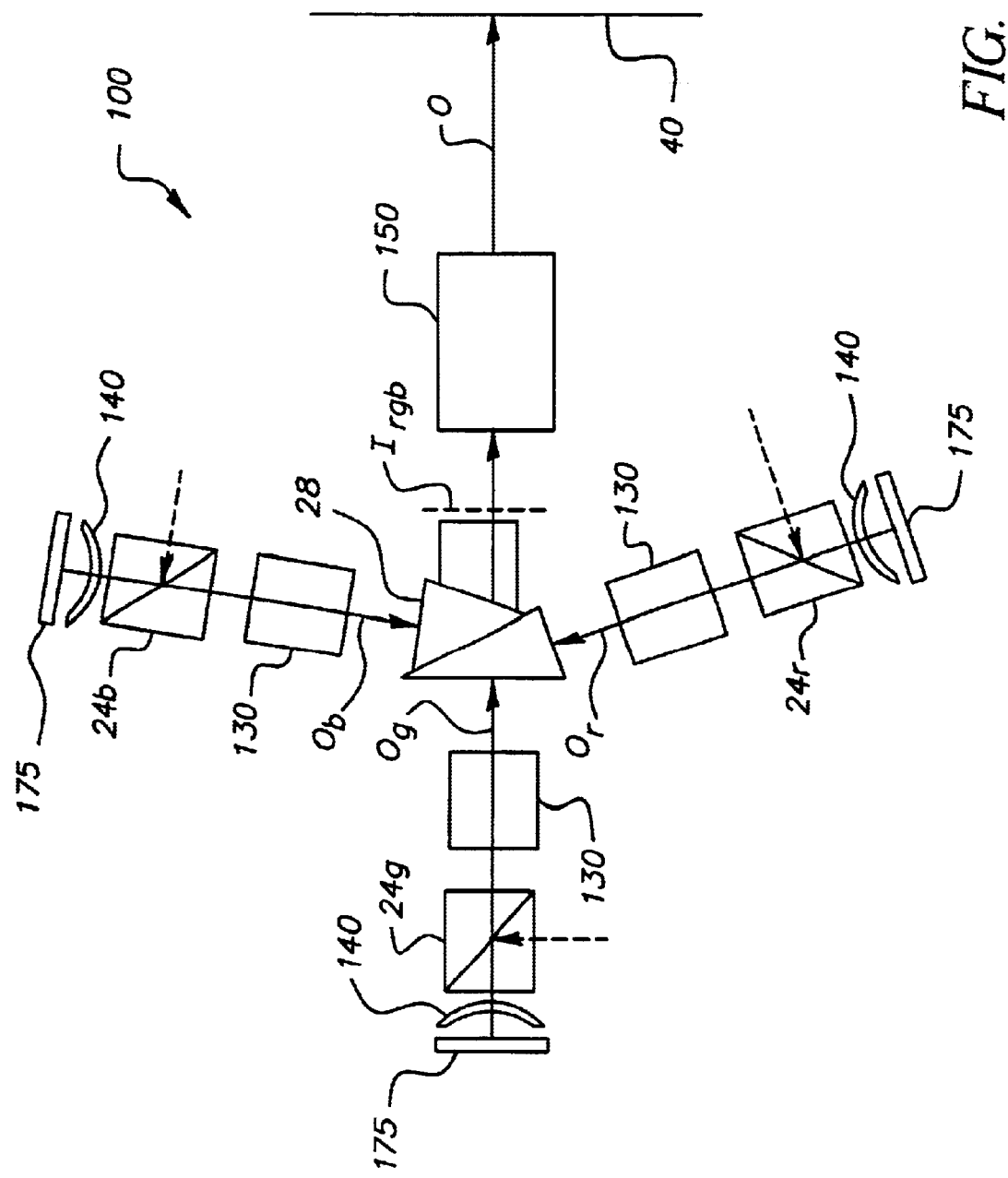
FIG. 14 is a schematic block diagram of an alternate design for an electronic projection system of the present invention.

It has been mentioned previously that an electronic projection system according to the present invention, utilizing intermediate imaging relay lenses 130 and an imager field lens 140 can be constructed with a dichroic combiner other than the preferred V-prism (dichroic combiner 155) shown in FIG. 2. The alternate use of an X-prism or X-cube can easily be inferred by comparing FIG. 1 (which has an X-prism type dichroic combiner 26) and FIG. 2. As another alternative, FIG. 14 depicts an electronic projector 100 of the present invention in which a Philips prism 28 is used to combine light from the different color channels (RGB). As before, the action of spatial light modulators 175 forms an image for each color channel. The modulated light from these images is transmitted along the respective optical axis $O_r$, $O_g$, $O_b$, through imager field lens 140, through a beamsplitter, through imaging relay lens 130 and to Philips prism 28. Then, Philips prism 28 combines the red, green, and blue modulated images from separate optical axes $O_r$, $O_g$, $O_b$ to form a combined, multicolor image $I_{rgb}$ near an exit face of the prism assembly and along a common optical axis O. Projection lens 150 re-images the multicolor image $I_{rgb}$ to the display surface 40. As previously, spatial light modulator 175 is preferably a polarization modulator array such as an LCD, and the beamsplitter is a polarization beamsplitter 24 such as a MacNeille type prism of a wire grid polarization beamsplitter.

Alternately, the system could be configured with polarization beam splitting prism and the dichroic combiner switched. As an example, FIG. 5 illustrates a potion of the projector, in which the wire grid polarization beamsplitter 170 is located in proximity to imager plane 275 and the dichroic combiner 155 is located in proximity to the internal image (I). In this alternate system, the dichroic combiner 155 is located in proximity to imager plane 275 and the polarization beamsplitter is located in proximity to the internal image (I). In this case, the polarization beamsplitter preferably comprises a glass block with an internal polarization splitting surface, such that it can be used in transmission without the optical aberrations of a tilted plate. A MacNeille type prism is one example of such a polarization beamsplitter that would be viable for this alternative configuration. This construction does have the potential disadvantage that it places numerous glass elements between the spatial light modulator (LCD) and the polarization beamsplitter, any one of which could possess residual stress birefringence that can degrade the polarization contrast.

As another alternative, it should be noted that the projector of the present invention can be made to work with spatial light modulators 175 that are other than LCDs. For example, in the system of FIG. 14, the spatial light modulator 175 could be a DMD type modulator instead of being an LCD. DMD devices do not modulate the polarization state, but the light directionality, on a pixel by pixel basis. In such a case, the system could be altered to substitute a total internal reflection (TIR) beamsplitter or another angularly sensitive optics, such as a Schlieren aperture mirror, for polarizing beamsplitter 24, as is well known in the digital projection art. The resulting electronic projector could still be constructed to provide an internal multicolor image $I_{rgb}$ at or near the dichroic combiner, which is the Philips prism 28 shown in FIG. 14, but which could also be a V-prism (as in FIG. 2) or an X-prism (as in FIG. 1). As previously, the imaging relay lenses 130 could operate at unity or near unity magnification, and provide a potentially advantaged system, with a reduced working distance requirement on the projection lens 150, resulting in a simplified, lower cost projection lens as compared to the systems on the market today. Certainly, the use of the imaging relay lenses 130 provides some offsetting costs that may mitigate the advantages. Designing the projector 100 to include imager field lenses 140 should reduce the cost and complexity of the imaging relay lenses 130. The projector 100 can be further designed with the imaging relay lenses 130 providing greater than unity magnification (2X, for example), such that the cost and complexity of the combining prism could be reduced. The resulting system may be further cost advantaged compared to the standard DMD type systems available in the market today.

Thus, what is provided is an improved electronic projection apparatus and method for image projection with an illumination system for providing, from a white light source, color illumination of high intensity and high efficiency, a modulation optical system having a spatial light modulator in each color channel and associated means to separate the modulated light from the unmodulated light, and an intermediate imaging optics in each color channel comprising imaging relay lenses for providing a suitable images for projection onto a display surface; in which each color channel employs an imager field lens between a beamsplitter and the respective spatial light modulator, for providing telecentric light at said spatial light modulators.

PARTS LIST

10 Projection apparatus
20 Light source
20r Light source, red
20g Light source, green
20b Light source, blue
22 Uniformizing optics
22r Uniformizing optics, red
22g Uniformizing optics, green
22b Uniformizing optics, blue
24 Polarizing beamsplitter
24r Polarizing beamsplitter, red
24g Polarizing beamsplitter, green
24b Polarizing beamsplitter, blue
26 Dichroic combiner
28 Philips prism
30 Spatial light modulator
30r Spatial light modulator, red
30g Spatial light modulator, green
30b Spatial light modulator, blue
32 Projection lens
34 Dichroic separator
40 Display surface
100 Projector
110 Illumination system
120 Modulation optical system
130 Imaging relay lens
140 Imager field lens
142 Imager field lens element
142' Imager field lens element
145 Ramsden eyepiece
150 Projection lens
155 Dichroic combiner
157 Internal surface
158 Exit face
160 Pre-polarizer
165 Polarization analyzer
170 Wire grid polarization beamsplitter
171 Sub-wavelength wires
172 Substrate
173 Polarization beamsplitter prism
175 Spatial light modulator
177 Modulator package
180 Polarization compensator
185 Second polarization compensator
190a Birefringent layer
190b Birefringent layer
190c Birefringent layer
195 Substrate
200 Internal image
210 Imaging aperture stop
250 Integrating bar
255 Base condenser
260 Focused source light
265 Illumination aperture stop
265a Re-imaged illumination aperture stop
270 Internal illumination image
275 Imager plane
280 Illumination lens
285 Color filter
287 Other optics
290 Optical axis

What is claimed is:

1. A display apparatus comprising:
   (a) a light source for forming a beam of light;
   (b) illumination optics for shaping and directing said beam of light;
   (c) a splitter for splitting said beam of light into at least three color beams of light;
   (d) a modulation optical system for each of said three color beams of light, comprising:
      (1) a pre-polarizer for polarizing said beam of light to provide a polarized beam of light of a given color;
      (2) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;
      (3) an imager field lens that provides nominally telecentric light to said reflective spatial light modulators
      (4) a reflective spatial light modulator wherein said reflective spatial light modulator receives said polarized beam of light, having either a first polarization or a second polarization, and selectively modulates said polarized beam of light to encode data thereon, providing both modulated light and unmodulated light which differ in polarization;
      (5) wherein said reflective spatial light modulator reflects back both said modulated light and said unmodulated light to said wire grid polarization beamsplitter,
      (6) wherein said wire grid polarization beamsplitter separates said modulated light from said unmodulated light; and
      (7) a polarization analyzer that receives said modulated light, and which further removes any residual unmodulated light from said modulated light;
      (8) an imaging relay lens in each color that provides an intermediate image of the reflective spatial light modulator from the modulated light for that color;
   (e) a dichroic combiner for re-combining the modulated light for each given color, such that the multiple color beams form the respective intermediate images along a common optical axis to form a combined intermediate image; and
   (f) a projection lens for imaging said combined intermediate image to a display screen.

2. The display apparatus as in claim 1 wherein said imager field lens is low stress or low absorption optical glass.

3. The display apparatus as in claim 1 wherein said imager field lens is fabricated from amorphous fused silica.

4. The display apparatus as in claim 1 wherein said imager field lens has uniform residual birefringence.

5. The display apparatus as in claim 1 wherein said imager field lens is constructed from two lens elements with crossed polarization axes to cancel residual retardances.

6. The display apparatus as in claim 1 wherein said imager field lens is mounted with a compliant adhesive.

7. The display apparatus as in claim 1 wherein said dichroic combiner is located in proximity to the intermediate images.

8. The display apparatus as in claim 1 wherein said dichroic combiner is a v-prism.

9. The display apparatus as in claim 1 wherein said dichroic combiner is an x-prism.

10. The display apparatus as in claim 1 wherein said dichroic combiner is a Philips prism.

11. The display apparatus as in claim 1 wherein said imaging relay lenses operate at a magnification greater than unity magnification.

12. The display apparatus as in claim 1 wherein said imaging relay lenses operate at a nominal 2X magnification.

13. The display apparatus as in claim 1 wherein said imaging relay lens is a double gauss type lens.

14. The display apparatus as in claim 1 wherein said imaging relay lens is double telecentric.

15. The display apparatus as in claim 1 wherein said illumination optics are constructed with an integrating bar and an internal intermediate image of said integrating bar.

16. The display apparatus as in claim 1 wherein said modulation optical system has at least one polarization compensator located between said wire grid polarization beamsplitter and said reflective liquid crystal device for conditioning oblique rays of said modulated beam.

17. The display apparatus as in claim 1 wherein said modulation optical system has two polarization compensators with said imager field lens located between them.

18. The display apparatus as in claim 17 wherein said polarization compensator or compensators provides corrective retardances for at least one of a group comprises of said wire grid polarization beam splitter, spatial light modulator, and imager field lens.

19. The display apparatus as in claim 1 wherein said pre-polarizer is a wire grid polarizer.

20. The display apparatus as in claim 1 wherein said polarization analyzer is a wire grid polarizer.

21. The display apparatus as in claim 1 wherein said spatial light modulator is a LCD.

22. The display apparatus as in claim 1 wherein said spatial light modulator is a vertically aligned LCD.

23. The display apparatus as in claim 1 wherein said imager field lens is part of a Ramsden eyepiece.

24. The display apparatus as in claim 1 wherein said dichroic combiner is located in proximity to the internal aperture stops of the imaging relay lenses.

25. A modulation optical system for providing modulation of an incident light beam comprising:

(a) a prepolarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;

(c) wherein said reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein a polarization compensator, located between said wire grid polarization beamsplitter and said reflective liquid crystal device, is provided for conditioning oblique light rays;

(f) wherein said wire grid polarization beamsplitter separates said modulated light from said unmodulated light;

(g) a polarization analyzer receives said modulated light, and which further removes any residual unmodulated light from said modulated light; and wherein said modulation optical system further comprises an imager field lens prior to each of said reflective spatial light modulator to provide nominally telecentric light to said spatial light modulators.

26. The modulation optical system as in claim 25 wherein said imager field lens is a low stress or low absorption optical glass.

27. The modulation optical system as in claim 25 wherein said imager field lens is fabricated from amorphous fused silica.

28. The modulation optical system as in claim 25 wherein said imager field lens has uniform residual birefringence.

29. The modulation optical system as in claim 25 wherein said imager field lens is constructed from two lens elements with crossed polarization axes to cancel residual retardances.

30. The modulation optical system as in claim 25 wherein said imager field lens is mounted with a compliant adhesive.

31. The modulation optical system as in claim 25 wherein said modulation optical system has two of said polarization compensators with said imager field lens located between them.

32. The modulation optical system as in claim 25 wherein said polarization compensator or compensators provides corrective retardances for at least one of said wire grid polarization beam splitter, said spatial light modulator, or said imager field lens.

33. The modulation optical system as in claim 25 wherein said pre-polarizer is a wire grid polarizer.

34. The modulation optical system as in claim 25 wherein said polarization analyzer is a wire grid polarizer.

35. The modulation optical system as in claim 25 wherein said modulation optical system is used in an image projection or an image printing device.

36. The modulation optical system as in claim 25 wherein said spatial light modulator is a LCD.

37. The modulation optical system as in claim 25 wherein said spatial light modulator is a vertically aligned LCD.

38. A modulation optical system as in claim 25 wherein said reflective spatial light modulator receives said polarized beam of light having a first polarization state transmitted through said wire grid polarization beamsplitter.

39. A modulation optical system as in claim 25 wherein said reflective spatial light modulator receives said polarized beam of light having a second polarization state reflected from said wire grid polarization beamsplitter.

40. A modulation optical system for providing modulation of an incident light beam comprising:

(a) polarization optics including at least two polarization devices, where at least one of said polarization devices is a wire grid polarization beamsplitter, wherein said wire grid polarization beamsplitter receives said incident beam of light, and transmits a polarized beam of light having a first polarization, and reflects a polarized beam of light having a second polarization nominally orthogonal to said first polarization, wherein subwavelength wires on said wire grid polarization beamsplitter face a reflective spatial light modulator;

(b) wherein said reflective spatial light modulator receives said polarized beam of light, having either a first polarization or a second polarization, and selectively modulates said polarized beam of light to encode data thereon, providing both modulated light and unmodulated light which differ in polarization;

(c) wherein said reflective spatial light modulator reflects back both said modulated light and said unmodulated light to said wire grid polarization beamsplitter;

(d) wherein a polarization compensator, located between said wire grid polarization beamsplitter and said reflective spatial light modulator, is provided for conditioning oblique light rays;

(e) wherein said wire grid polarization beamsplitter separates said modulated light from said unmodulated light; and (f) wherein said modulation optical system further comprises an imager field lens prior to said reflective spatial light modulator.

41. The modulation optical system as in claim 40 wherein said imager field lens provides nominally telecentric light to the spatial light modulator.

42. The modulation optical system as in claim 40 wherein said imager field lens is a low stress or low absorption optical glass.

43. The modulation optical system as in claim 40 wherein said imager field lens is fabricated from amorphous fused silica.

44. The modulation optical system as in claim 40 wherein said imager field lens has uniform residual birefringence.

45. The modulation optical system as in claim 40 wherein said imager field lens is constructed from two lens elements with crossed polarization axes to cancel residual retardances.

46. The modulation optical system as in claim 40 wherein said imager field lens is mounted with a compliant adhesive.

47. The modulation optical system as in claim 40 wherein said modulation optical system has two compensators with said imager field lens located between them.

48. The modulation optical system as in claim 40 wherein said polarization compensator or compensators provides corrective retardances for at least one of the wire grid PBS, the spatial light modulator, and the imager field lens.

49. The modulation optical system as in claim 40 wherein said modulation optical system further comprises a pre-polarizer.

50. The modulation optical system as in claim 49 wherein said pre-polarizer is a wire grid polarizer.

51. The modulation optical system as in claim 40 wherein said modulation optical system further comprises a polarization analyzer.

52. The modulation optical system as in claim 51 wherein said polarization analyzer is a wire grid polarizer.

53. The modulation optical system as in claim 40 wherein said modulation optical system receives an incident light beam that is pre-polarized.

54. A modulation optical system as in claim 40 wherein said reflective spatial light modulator receives said polarized beam of light having a first polarization state transmitted through said wire grid polarization beamsplitter.

55. A modulation optical system as in claim 40 wherein said reflective spatial light modulator receives said polarized beam of light having a second polarization state reflected from said wire grid polarization beamsplitter.

56. The modulation optical system as in claim 40 wherein said modulation optical system is used in an image projection or an image printing device.

57. The modulation optical system as in claim 40 wherein said spatial light modulator is an LCD.

58. The modulation optical system as in claim 40 wherein said spatial light modulator is a vertically aligned LCD.

59. A modulation optical system for providing modulation of an incident light beam comprising:

(a) polarization optics including at least two polarization devices, where at least one of said polarization devices is a polarization beamsplitter, wherein said polarization beamsplitter receives said incident beam of light, and transmits a polarized beam of light having a first polarization, and reflects a polarized beam of light having a second polarization nominally orthogonal to said first polarization;

(b) wherein a reflective spatial light modulator receives said polarized beam of light, having either a first polarization or a second polarization, and selectively modulates said polarized beam of light to encode data thereon, providing both modulated light and unmodulated light which differ in polarization;

(c) wherein said reflective spatial light modulator reflects back both said modulated light and said unmodulated light to said polarization beamsplitter;

(d) wherein a polarization compensator, located between said polarization beamsplitter and said reflective spatial light modulator, is provided for conditioning oblique light rays;

(e) wherein said polarization beamsplitter separates said modulated light from said unmodulated light; and (f) wherein said modulation optical system further comprises an imager field lens prior to said reflective spatial light modulator.

60. The modulation optical system as in claim 59 wherein said polarization beamsplitter is a MacNeille type prism.

61. The modulation optical system as in claim 59 wherein said polarization beam splitter is a wire grid.

62. The modulation optical system as in claim 59 wherein said imager field lens provides nominally telecentric light to the spatial light modulator.

63. The modulation optical system as in claim 59 wherein said imager field lens is a low stress or low absorption optical glass.

64. The modulation optical system as in claim 59 wherein said imager field lens is fabricated from amorphous fused silica.

65. The modulation optical system as in claim 59 wherein said imager field lens has uniform residual birefringence.

66. The modulation optical system as in claim 59 wherein said imager field lens is constructed from two lens elements with crossed polarization axes to cancel residual retardances.

67. The modulation optical system as in claim 59 wherein said imager field lens is mounted with a compliant adhesive.

68. The modulation optical system as in claim 59 wherein said modulation optical system has two compensators, with the imager field lens located between them.

69. The modulation optical system as in claim 59 wherein said polarization compensator or compensators provides corrective retardances for at least one of the wire grid PBS, the spatial light modulator, and the imager field lens.

70. The modulation optical system as in claim 59 wherein said modulation optical system further comprises a pre-polarizer.

71. The modulation optical system as in claim 70 wherein said pre-polarizer is a wire grid polarizer.

72. The modulation optical system as in claim 70 wherein said polarization analyzer is a wire grid polarizer.

73. The modulation optical system as in claim 59 wherein said modulation optical system further comprises a polarization analyzer.

74. The modulation optical system as in claim 59 wherein said modulation optical system receives an incident light beam that is pre-polarized.

75. A modulation optical system as in claim 59 wherein said reflective spatial light modulator receives said polarized beam of light having a first polarization state transmitted through said polarization beamsplitter.

76. A modulation optical system as in claim 59 wherein said reflective spatial light modulator receives said polarized beam of light having a second polarization state reflected through said polarization beamsplitter.

77. The modulation optical system as in claim 59 wherein said modulation optical system is used in an image projection or an image printing device.

78. The modulation optical system as in claim 59 wherein said spatial light modulator is an LCD.

79. The modulation optical system as in claim 59 wherein said spatial light modulator is a vertically aligned LCD.

80. A display apparatus comprising:
(a) a light source for forming a beam of light;
(b) illumination optics for shaping and directing said beam of light;
(c) a splitter for splitting said beam of light into at least three color beams of light;
(d) a modulation optical system for each of said three color beams of light, comprising:
  (1) a pre-polarizer for polarizing said beam of light to provide a polarized beam of light of a given color;
  (2) a transmissive spatial light modulator wherein said transmissive spatial light modulator receives said polarized beam of light, and selectively modulates said polarized beam of light to encode data thereon, providing both modulated light and unmodulated light which differ in polarization;
  (3) an imager field lens that provides nominally telecentric light to said transmissive spatial light modulators
  (4) wherein a polarization analyzer separates said modulated light from said unmodulated light; and
  (5) an imaging relay lens in each color that provides an intermediate image of the transmissive spatial light modulator from the modulated light for that color;
(e) a dichroic combiner for re-combining the modulated light for each given color, such that the multiple color beams form the respective intermediate images along a common optical axis to form a combined intermediate image; and
(f) a projection lens for imaging said combined intermediate image to a display screen.

81. A display apparatus as in claim 80 wherein said polarization analyzer is a wire grid polarizer or a wire grid polarization beam splitter.

82. A display apparatus as in claim 80 that further comprises a polarization compensator.

83. A display apparatus as in claim 80 wherein said transmissive spatial light modulator is a Liquid Crystal Display (LCD).

84. A display apparatus comprising:
(a) a light source for forming a beam of light;
(b) illumination optics for shaping and directing said beam of light;
(c) a splitter for splitting said beam of light into at least three color beams of light;
(d) a modulation optical system for each of said three color beams of light, comprising:
  (1) an angle sensitive optic for directing light into a digital micromirror device;
  (2) an imager field lens that provides nominally telecentric light to said digital micromirror device;
  (3) a digital micromirror device wherein said digital micromirror device receives said beam of light, and selectively modulates said beam of light to encode data thereon, providing both modulated light and unmodulated light which differs in angular directionality over light;
  (4) wherein said digital micromirror device reflects back both said modulated light and said unmodulated light to said angle sensitive optic;
  (5) wherein said angle sensitive optic separates said modulated light from said unmodulated light; and
  (6) an imaging relay lens in each color that provides an intermediate image of the digital micromirror device from the modulated light for that color;
(e) a dichroic combiner for re-combining the modulated light for each given color, such that the multiple color beams form the respective intermediate images along a common optical axis to form a combined intermediate image; and
(f) a projection lens for imaging said combined intermediate image to a display screen.

85. A display apparatus as in claim 84 wherein said angle sensitive optic is a Philips prism.

86. A modulation optical system for providing modulation of an incident light beam comprising:
(a) polarization optics including at least two polarization devices, where at least one of said polarization devices is a polarization beamsplitter, wherein said polarization beamsplitter receives said incident beam of light, and transmits a polarized beam of light having a first polarization, and reflects a polarized beam of light having a second polarization nominally orthogonal to said first polarization;
(b) wherein a reflective spatial light modulator receives said polarized beam of light, having either a first polarization or a second polarization, and selectively modulates said polarized beam of light to encode data thereon, providing both modulated light and unmodulated light which differ in polarization;
(c) wherein said reflective spatial light modulator reflects back both said modulated light and said unmodulated light to said polarization beamsplitter;
(d) wherein said polarization beamsplitter separates said modulated light from said unmodulated light; and
(e) wherein said modulation optical system further comprises an imager field lens prior to said reflective spatial light modulator.

* * * * *